United States Patent
Bando

(10) Patent No.: US 9,578,198 B2
(45) Date of Patent: Feb. 21, 2017

(54) APPLICATION COOPERATION SYSTEM INCLUDING SERVER AND IMAGE PROCESSING APPARATUS, AND APPLICATION COOPERATION METHOD

(75) Inventor: Ryoji Bando, Sakai (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 555 days.

(21) Appl. No.: 13/541,201

(22) Filed: Jul. 3, 2012

(65) Prior Publication Data

US 2013/0019160 A1 Jan. 17, 2013

(30) Foreign Application Priority Data

Jul. 14, 2011 (JP) ................................. 2011-155445

(51) Int. Cl.
*G06F 17/00* (2006.01)
*H04N 1/00* (2006.01)
*G06F 17/22* (2006.01)

(52) U.S. Cl.
CPC ...... *H04N 1/00973* (2013.01); *G06F 17/2247* (2013.01); *H04N 1/0044* (2013.01);
(Continued)

(58) Field of Classification Search
CPC .............................. H04N 1/32; G06F 17/2247
(Continued)

(56) References Cited

U.S. PATENT DOCUMENTS 6,873,841 B1* 3/2005 Sagar ...................... H04L 29/06
379/88.18
8,269,988 B2* 9/2012 Kuroda ................ H04N 1/3877
345/658
(Continued)

FOREIGN PATENT DOCUMENTS

CN 1691033 A 11/2005
CN 102088531 A 6/2011
(Continued)

OTHER PUBLICATIONS

Notice of Ground of Rejection issued in corresponding Chinese Patent Application No. 201210239444.1, dated Aug. 5, 2014, and English translation thereof.

(Continued)

*Primary Examiner* — Laurie Ries
(74) *Attorney, Agent, or Firm* — Buchanan Ingersoll & Rooney PC

(57) ABSTRACT

An application cooperation system includes an instruction screen display control portion which causes a browsing portion to display a scan instruction screen, a scan control portion which stores image data output from a document reading portion, an external screen receiving portion which receives an external screen including an external control command from the external server for storage, an internal screen generating portion which generates an internal screen including an internal control command and an image data displaying area, an integrated screen generating portion which generates an integrated screen by combining the internal and external screens for output to the internal server portion, and a location information notification portion which obtains the integrated screen's network address from the internal server portion for output to the external server. The external server returns redirect information including (Continued)

the integrated screen's network address to the browsing portion in response to a transmission request.

26 Claims, 15 Drawing Sheets

(52) U.S. Cl.
CPC ..... *H04N 1/00244* (2013.01); *H04N 1/00411* (2013.01); *H04N 1/00464* (2013.01); *H04N 1/00474* (2013.01); *H04N 1/00482* (2013.01); *H04N 2201/0039* (2013.01); *H04N 2201/0094* (2013.01)

(58) Field of Classification Search
USPC .......................................................... 715/234
See application file for complete search history.

(56) References Cited

U.S. PATENT DOCUMENTS

| | | | |
|---|---|---|---|
| 2005/0105129 A1 | 5/2005 | Takahashi | |
| 2007/0046996 A1 | 3/2007 | Matsuda | |
| 2007/0268517 A1 | 11/2007 | Koarai | |
| 2009/0268229 A1* | 10/2009 | Richardson et al. | ........ 358/1.15 |
| 2010/0039664 A1* | 2/2010 | Funakawa | ..................... 358/1.15 |
| 2011/0119333 A1* | 5/2011 | Tamura | ............... H04N 1/00222 709/203 |
| 2011/0125899 A1* | 5/2011 | Yamamoto | ........... G06F 17/3028 709/225 |
| 2011/0134456 A1* | 6/2011 | Tsujimoto | ........... H04N 1/00204 358/1.13 |
| 2011/0157638 A1* | 6/2011 | Yamada | ....................... 358/1.15 |

FOREIGN PATENT DOCUMENTS

| | | |
|---|---|---|
| JP | 2005-167988 A | 6/2005 |
| JP | 2006-237705 A | 9/2006 |
| JP | 2007-060556 A | 3/2007 |
| JP | 2007-122656 A | 5/2007 |
| JP | 2007-282136 A | 10/2007 |
| JP | 2008-086028 A | 4/2008 |
| JP | 2011-124652 A | 6/2011 |

OTHER PUBLICATIONS

Office Action (Notice of Ground of Rejection) issued on Dec. 3, 2013, by the Japanese Patent Office in corresponding Japanese Patent Application No. 2011-155445, and an English Translation of the Office Action. (4 pages).

\* cited by examiner

F I G. 1 2
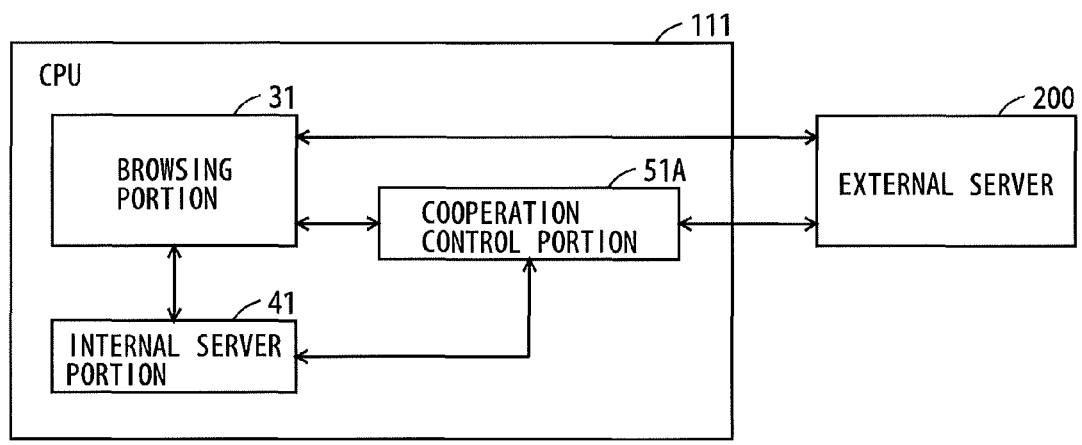

F I G. 1 5
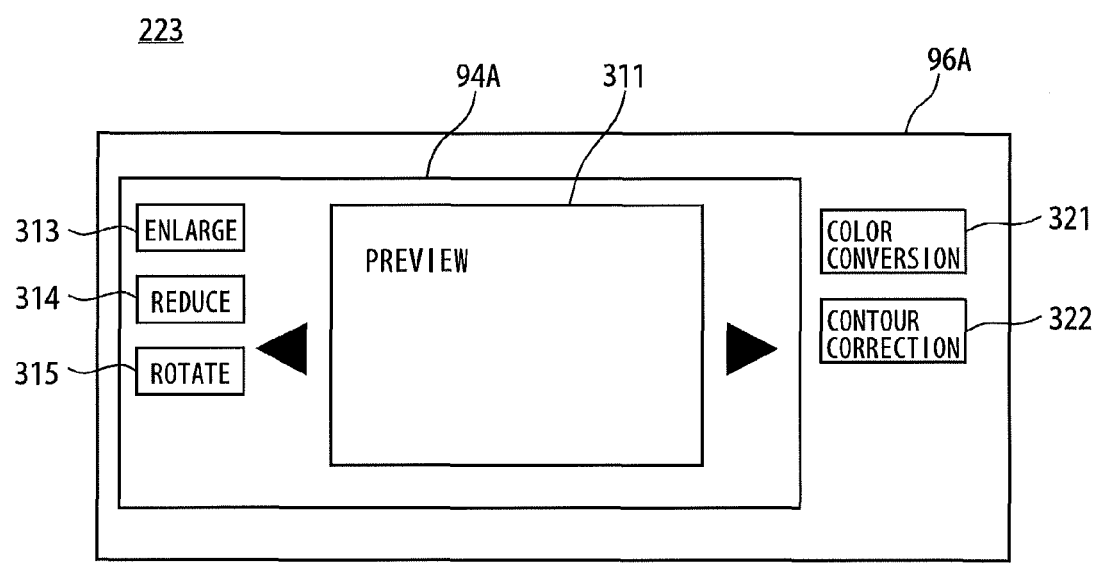

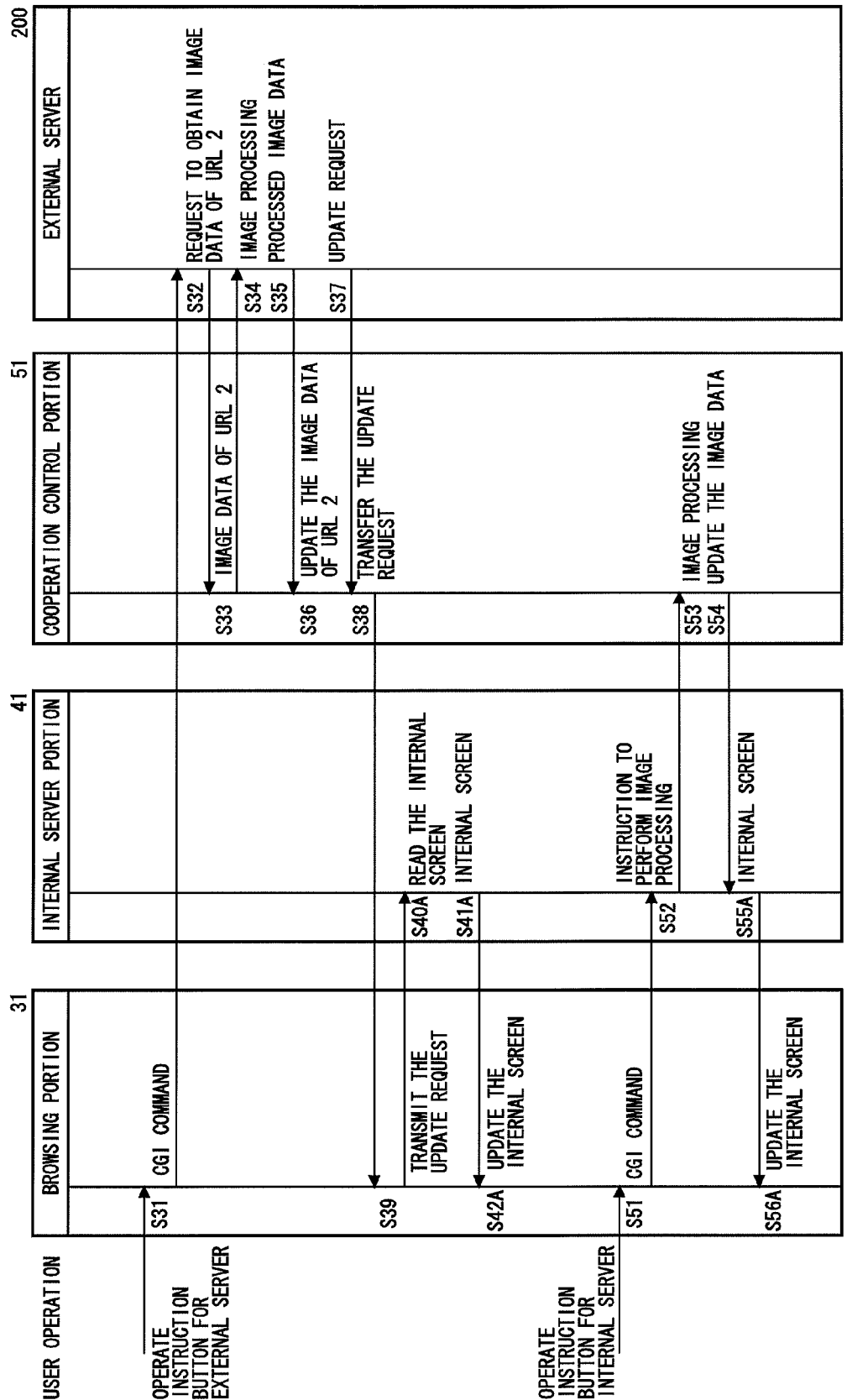

APPLICATION COOPERATION SYSTEM INCLUDING SERVER AND IMAGE PROCESSING APPARATUS, AND APPLICATION COOPERATION METHOD

This application is based on Japanese Patent Application No. 2011-155445 filed with Japan Patent Office on Jul. 14, 2011, the entire content of which is hereby incorporated by reference.

BACKGROUND OF THE INVENTION

Field of the Invention

The present invention relates to an application cooperation system and an application cooperation method. More particularly, the present invention relates to an application cooperation system which includes a server and an image processing apparatus having an application program installed therein which performs processing in cooperation with the server, and an application cooperation method performed by the application cooperation system.

Description of the Related Art

When there is processing that cannot be performed by a multi-function peripheral (hereinafter, referred to as an "MFP"), that processing can be performed using a service, such as "software as service (SaaS)", provided by a server. In this case, a server client system having a server serving as a Web server and an MFP serving as a client is generally used, and the data that has been processed in the Web server is received by the MFP for output.

In a conventional server client system, however, the operation screen displayed on an MFP for a user to operate the MFP is the one generated by and received from a server. Therefore, in the state where the operation screen received from the server is being displayed in the MFP, the user cannot instruct the MFP to perform image processing on the data that has been scanned in the MFP. In order to cause the MFP to perform image processing on the data scanned in the MFP, it is necessary to display an operation screen that has been prepared in advance in the MFP. This produces the need to switch the screen between the operation screen received from the server and the operation screen prepared in the MFP.

Further, Japanese Patent Laid-Open No. 2005-167988 discloses an image processing system that is made up of an MFP connected to the Internet and one or more service providers which provide predetermined processing services. In this system, a controller in the MFP obtains from the service providers the processing function information about the services available from the providers, and the controller causes an operation portion in the MFP to display, in an alternative manner, a first processing function based on the processing function information acquired, and a second processing function executable by the MFP. With the conventional image processing system, while the system may be able to perform either the first processing function based on the processing function information about the services available from the service providers or the second processing function executable by the MFP, it is not possible for a user to designate the first processing function and the second processing function using a single operation screen.

SUMMARY OF THE INVENTION

An aspect of the present invention provides an application cooperation system which includes: a document reading portion configured to read a document to output image data; a storing portion configured to store a page described in a markup language; a browsing portion configured to request a page described in the markup language and display the page received in response to the request; an internal server portion configured to output the page stored in the storing portion in response to a request from the browsing portion; and a cooperation control portion configured to cause the browsing portion, the internal server portion, and an external server to cooperate with each other, the cooperation control portion including an instruction screen display control portion configured to start the browsing portion to cause the browsing portion to display a page including a scan instruction screen stored in the external server, a scan control portion operable, in response to acceptance of a scan instruction input by a user on the basis of the scan instruction screen being displayed, to control the document reading portion and store image data output from the document reading portion in the storing portion, an external screen receiving portion configured to receive an external screen from the external server and store the external screen in the storing portion, the external screen including an area for accepting a designation from a user, and an external control command assigned to the area for accepting the user designation and for causing the external server to perform predetermined processing, an internal screen generating portion configured to generate an internal screen, the internal screen including an area for accepting a designation from a user, an internal control command assigned to the area for accepting the user designation and for causing the internal server portion to perform predetermined processing, and an area for displaying the stored image data, an integrated screen generating portion configured to generate an integrated screen by combining the internal screen and the stored external screen, and output the generated integrated screen to the internal server portion, and a screen location information notification portion configured to obtain a network address of the integrated screen from the internal server portion and transmit the obtained network address to the external server; wherein the external server is operable, in response to reception of a transmission request requesting transmission of a next screen from the browsing portion after the scan instruction screen was transmitted to the browsing portion, to return redirect information including the network address of the integrated screen to the browsing portion.

Another aspect of the present invention provides an application cooperation system which includes: a document reading portion configured to read a document to output image data; a storing portion configured to store a page described in a markup language; a browsing portion configured to request a page described in the markup language and display the page received in response to the request; an internal server portion configured to output the page stored in the storing portion in response to a request from the browsing portion; and a cooperation control portion configured to cause the browsing portion, the internal server portion, and an external server to cooperate with each other, the cooperation control portion including an instruction screen display control portion configured to start the browsing portion to cause the browsing portion to display a page including a scan instruction screen stored in the external server, a scan control portion operable, in response to acceptance of a scan instruction input by a user on the basis of the scan instruction screen being displayed, to control the document reading portion and store image data output from the document reading portion in the storing portion, an internal screen generating portion configured to generate an internal screen and output the generated internal screen to the internal server portion, the internal screen including an area for accepting a designation from a user, an internal control command assigned to the area for accepting the user designation and for causing the internal server portion to perform predetermined processing, and an area for displaying the stored image data, and a screen location information notification portion configured to obtain a network address of the internal screen from the internal server portion and transmit the obtained network address of the internal screen to the external server; wherein the external server includes an integrated screen generating portion configured to generate an integrated screen in response to reception of the network address of the internal screen, the integrated screen including an area for accepting a designation from a user, an external control command assigned to the area for accepting the user designation and for causing the external server to perform predetermined processing, and a partial display area for displaying the internal screen specified by the received network address, the integrated screen having described therein a command to transmit a transmission request including the received network address so as to display the internal screen in the partial display area, and wherein the external server is configured to return the integrated screen in response to reception of a transmission request requesting transmission of a next screen from the browsing portion after the scan instruction screen was transmitted to the browsing portion.

A further aspect of the present invention provides an application cooperation method performed by an application cooperation system including an image processing apparatus and an external server, the image processing apparatus including a document reading portion configured to read a document to output image data, a storing portion configured to store a page described in a markup language, a browsing portion configured to request a page described in the markup language and display the page received in response to the request, and an internal server portion configured to output the page stored in the storing portion in response to a request from the browsing portion, wherein the application cooperation method causes the image processing apparatus to perform steps of: starting the browsing portion to cause the browsing portion to display a page including a scan instruction screen stored in the external server; controlling the document reading portion in response to acceptance of a scan instruction input by a user on the basis of the scan instruction screen being displayed, and storing image data output from the document reading portion in the storing portion; receiving an external screen from the external server and storing the external screen in the storing portion, the external screen including an area for accepting a designation from a user, and an external control command assigned to the area for accepting the user designation and for causing the external server to perform predetermined processing; generating an internal screen, the internal screen including an area for accepting a designation from a user, an internal control command assigned to the area for accepting the user designation and for causing the internal server portion to perform predetermined processing, and an area for displaying the stored image data; generating an integrated screen by combining the internal screen and the stored external screen, and outputting the generated integrated screen to the internal server portion; and obtaining a network address of the integrated screen from the internal server portion and transmitting the obtained network address to the external server; and wherein the application cooperation method causes the external server to perform a step of, in response to reception of a transmission request requesting transmission of a next screen from the browsing portion after the scan instruction screen was transmitted to the browsing portion, returning redirect information including the network address of the integrated screen to the browsing portion.

Yet another aspect of the present invention provides an application cooperation method performed by an application cooperation system including an image processing apparatus and an external server, the image processing apparatus including a document reading portion configured to read a document to output image data, a storing portion configured to store a page described in a markup language, a browsing portion configured to request a page described in the markup language and display the page received in response to the request, and an internal server portion configured to output the page stored in the storing portion in response to a request from the browsing portion, wherein the application cooperation method causes the image processing apparatus to perform steps of; starting the browsing portion to cause the browsing portion to display a page including a scan instruction screen stored in the external server; controlling the document reading portion in response to acceptance of a scan instruction input by a user on the basis of the scan instruction screen being displayed, and storing image data output from the document reading portion in the storing portion; generating an internal screen, the internal screen including an area for accepting a designation from a user, an internal control command assigned to the area for accepting the user designation and for causing the internal server portion to perform predetermined processing, and an area for displaying the stored image data; outputting the generated internal screen to the internal server portion; and obtaining a network address of the internal screen from the internal server portion and transmitting the obtained network address of the internal screen to the external server; and wherein the application cooperation method causes the external server to perform steps of; generating an integrated screen in response to reception of the network address of the internal screen, the integrated screen including an area for accepting a designation from a user, an external control command assigned to the area for accepting the user designation and for causing the external server to perform predetermined processing, and a partial display area for displaying the internal screen specified by the received network address, the integrated screen having described therein a command to transmit a transmission request including the received network address so as to display the internal screen in the partial display area; and returning the integrated screen in response to reception of a transmission request requesting transmission of a next screen from the browsing portion after the scan instruction screen was transmitted to the browsing portion.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 12 shows, by way of example, the functions of a CPU included in the MFP according to a second embodiment of the present invention;

FIG. 15 shows an example of an integrated screen according to the second embodiment; and FIGS. 16 and 17 are flowcharts illustrating a relation of the process flows in a browsing portion, internal server portion, cooperation control portion, and external server according to the second embodiment.

DESCRIPTION OF THE PREFERRED EMBODIMENTS

Figure 1:
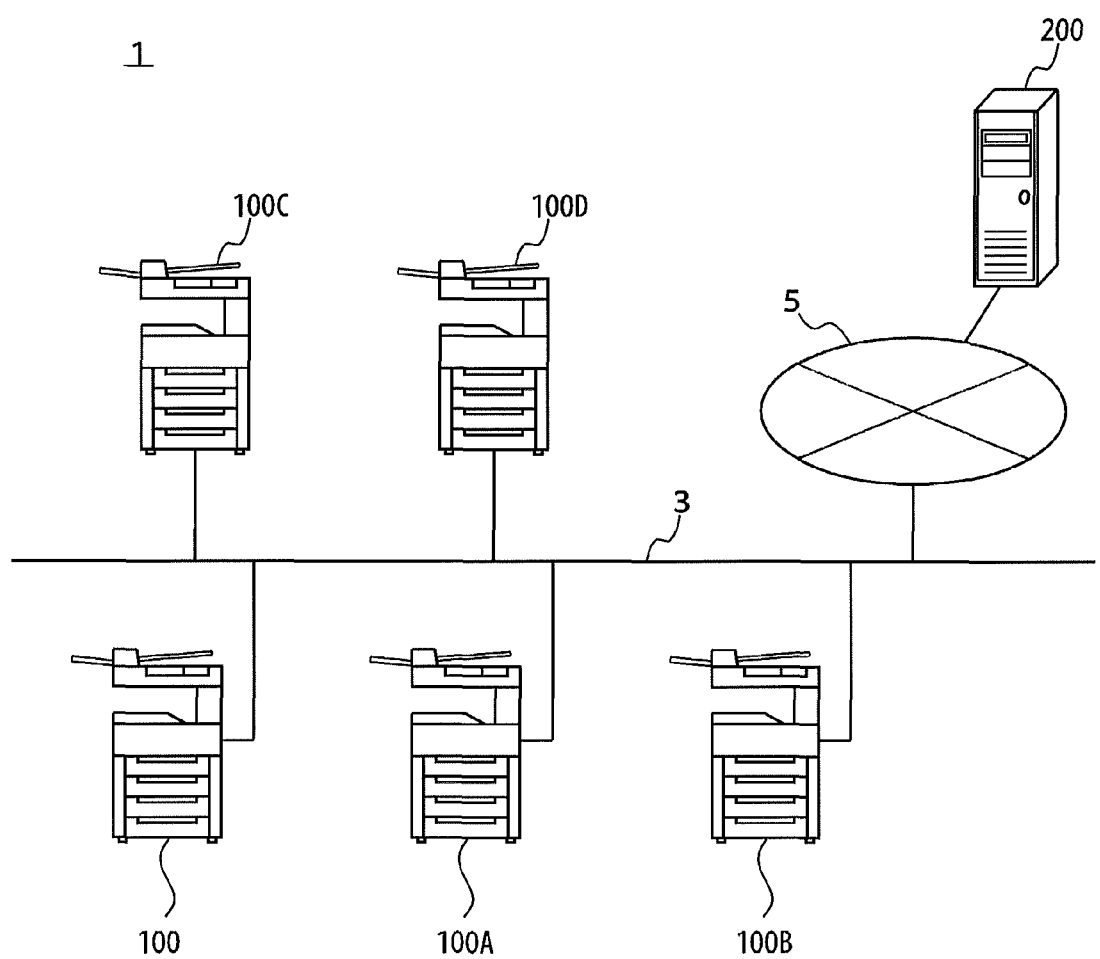
FIG. 1 schematically shows an application cooperation system according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

First Embodiment

FIG. 1 schematically shows an application cooperation system according to an embodiment of the present invention. Referring to FIG. 1, an application cooperation system 1 includes multi-function peripherals (MFPs) 100 and 100A to 100D, which are each connected to a network 3, and an external server 200 which is connected to the Internet 5.

Network 3 is a local area network (LAN), which may be connected in a wired or wireless manner. MFPs 100 and 100A to 100D are capable of communicating with each other via network 3, and with external server 200 connected via the Internet 5. Network 3 is not necessarily the LAN; it may be the Internet, a wide area network (WAN), public switched telephone networks, and the like.

External server 200, which is a typical computer, provides a data processing service. The data processing service provided by external server 200 is a service for receiving data from the outside, processing the received data, and returning the resultant, processed data. The data processing refers to processing performed on input image data, which includes, for example, character recognition processing for performing optical character recognition (OCR) to convert the image data to the character data, translation processing for translating the characters, color conversion processing for converting the color of an area of an image in the data, contour enhancement processing for enhancing the contour of an area of an image in the data, and format conversion processing for converting the format of the data. It is noted that the data processing service provided by external server 200 is not restricted thereto; it may be any processing performed on data.

The data processing service provided by external server 200 is set in each of MFPs 100 and 100A to 100D such that any of MFPs 100 and 100A to 100D can use that service.

MFPs 100 and 100A to 100D, which are examples of an image processing apparatus, each have a plurality of functions such as the scanning function, printing function, copying function, and facsimile transmitting/receiving function. Further, MFPs 100 and 100A to 100D each have a common gateway interface (CGI) and serve as an Internet Web server (hereinafter, referred to as the "IWS"). Here, a part in each of MFPs 100 and 100A to 100D that functions as the IWS is called an internal server.

Further, an application program interface (API) as a function for starting the CGI has been released, allowing a user to use the API to develop an application program and install the same in any of MFPs 100 and 100A to 100D. For setting such that each of MFPs 100 and 100A to 100D can use the data processing service provided by external server 200, an application cooperation program is installed into each of MFPs 100 and 100A to 100D. The application cooperation program refers to an application program for performing processing in cooperation with external server 200, the program having been developed using the API released as a function for starting the CGI in each of MFPs 100 and 100A to 100D.

Furthermore, MFPs 100 and 100A to 100D each have a browsing program installed therein, the program causing a computer to perform processing of requesting a Web page described in a markup language and displaying the received Web page. As the browsing program is executed by a central processing unit (CPU) included in each of MFPs 100 and 100A to 100D, a task of executing the browsing program is formed in the CPU. This task of executing the browsing program, formed in the CPU, serves as a user interface of any of MFPs 100 and 100A to 100D that functions as the IWS and external server 200. For example, in the case of MFP 100, the task for the CPU included in MFP 100 to execute the browsing program serves as a task of executing a program for functioning as the IWS, or as a user interface of external server 200.

MFPs 100 and 100A to 100D may all have the same functions, or may each have different functions. Basically, MFPs 100 and 100A to 100D each have at least a document reading function of reading a document to output image data, and may additionally have any of the following functions: an image forming function of forming an image of image data on a sheet of paper; an image processing function of processing image data; a post-processing function of performing punching, sorting, or other post-processing on the sheets of paper on which images have been formed; and a facsimile transmitting/receiving function.

While MFPs 100 and 100A to 100D may have different functions, it is here assumed that MFP 100 has any function included in any of the other MFPs 100A to 100D.

Figure 2:
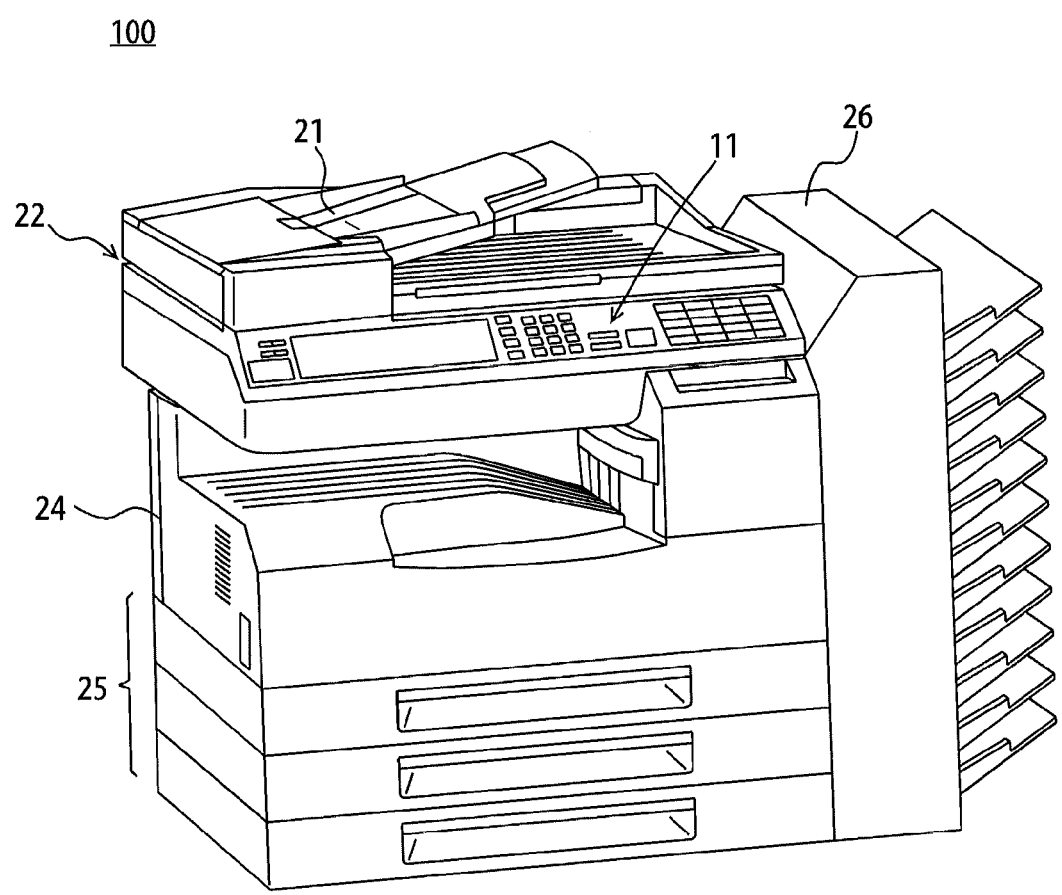
FIG. 2 is a perspective view of an MFP.

FIG. 2 is a perspective view of an MFP. Referring to FIG. 2, MFP 100 includes an automatic document feeder (ADF) 21, an image reading portion 22, an image processing portion 23 (see FIG. 3), an image forming portion 24, a paper feeding portion 25, and a post-processing portion 26.

MFP 100 also has, on its upper surface, an operation panel 11 serving as a user interface.

Figure 3:
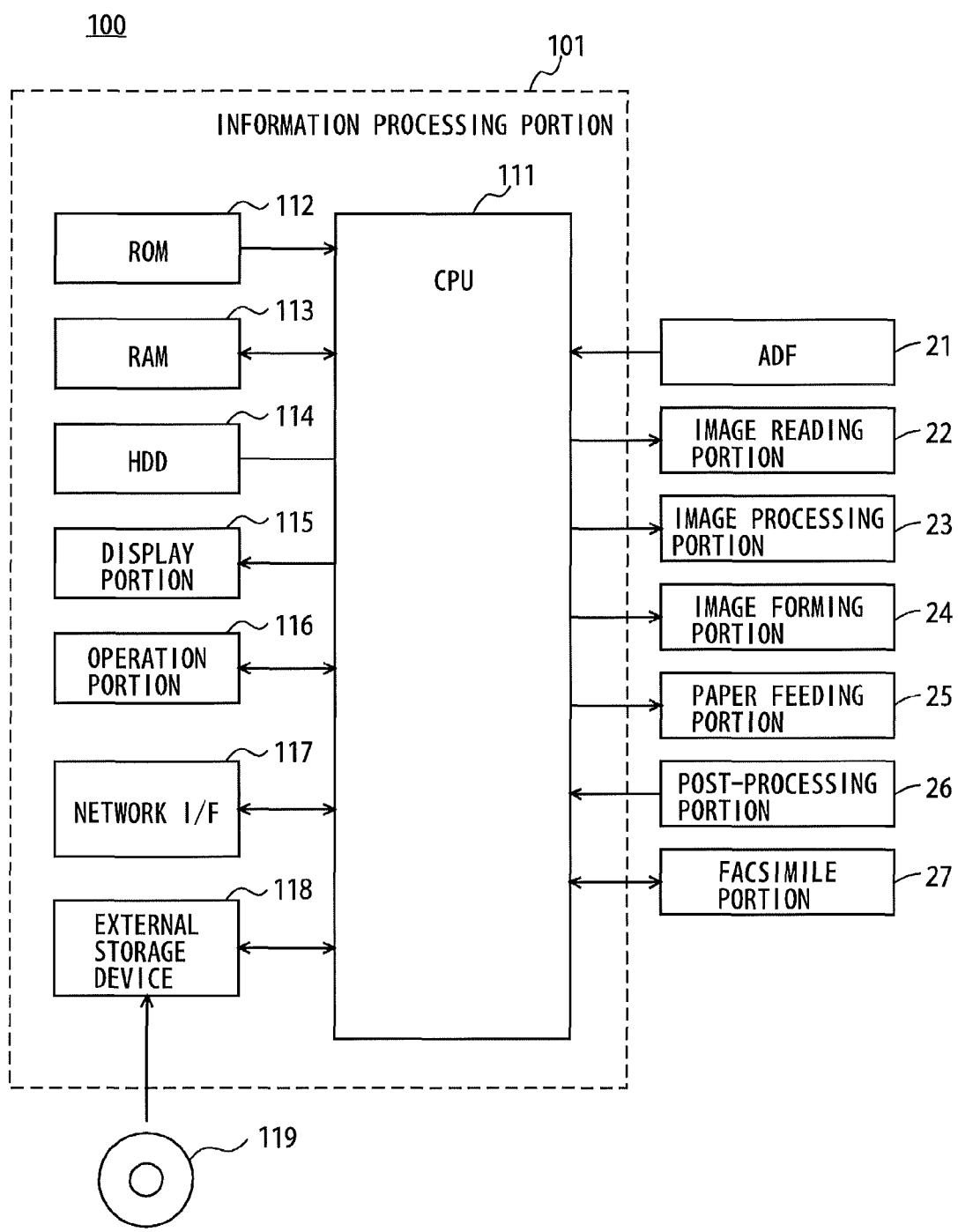
FIG. 3 is a block diagram showing, by way of example, the hardware configuration of the MFP.

FIG. 3 is a block diagram showing, by way of example, the hardware configuration of the MFP. Referring to FIG. 3, MFP 100 includes: an information processing portion 101; ADF 21; image reading portion 22; image processing portion 23; image forming portion 24; paper feeding portion 25; post-processing portion 26; and a facsimile portion 27. Information processing portion 101 includes: a CPU 111; a read only memory (ROM) 112 which stores a program executed by CPU 111 and others; a random access memory (RAM) 113 used as a work area for CPU 111; a hard disk drive (HDD) 114 which stores data in a nonvolatility manner; a display portion 115; an operation portion 116; a network interface (I/F) 117; and an external storage device 118.

CPU 111 is connected with ROM 112, RAM 113, HDD 114, display portion 115, operation portion 116, network I/F 117, and external storage device 118, and is responsible for overall control of information processing portion 101. Further, CPU 111 is connected with ADF 21, image reading portion 22, image processing portion 23, image forming portion 24, paper feeding portion 25, post-processing portion 26, and facsimile portion 27, and is responsible for overall control of MFP 100.

ADF 21 carries a plurality of documents set in a document feed tray one by one to image reading portion 22. To cause image reading portion 22 to read only one side of a document, ADF 21 carries a document to image reading portion 22 to cause it to read the side. To cause image reading portion 22 to read both sides of a document, ADF 21 carries a document to image reading portion 22 to cause it to read one side, before turning the document over and carrying the same to image reading portion 22 to cause it to read the other side. Image reading portion 22 optically reads image information such as a photograph, character, picture, and the like from a document to obtain image data, and outputs the image data to image processing portion 23.

Image processing portion 23 is controlled by CPU 111, and performs image processing on image data on the basis of an instruction from CPU 111. The image data includes: image data output from image reading portion 22 which has read a document; image data included in a print job which is received from another computer through network I/F 117; image data which is received from any of the other MFPs 100A to 100D through network I/F 117; and image data which is stored in HDD 114. The image processing includes, for example: image enlargement processing of enlarging an image in size; image reduction processing of reducing an image in size; synthesis processing of synthesizing a plurality of images to generate an image; and rotation processing of rotating an image to change the direction thereof.

Paper feeding portion 25 has a plurality of paper feed trays, and supplies sheets of paper stored in a designated paper feed tray, one by one, to image forming portion 24. The paper feed trays each store sheets of paper of a size selected from a plurality of sizes, in the state where the sheets are placed in an orientation selected from a plurality of orientations.

Image forming portion 24 forms an image on the sheet of paper fed from paper feeding portion 25, on the basis of the image data.

Post-processing portion 26 discharges sheets of paper having images formed thereon. Post-processing portion 26 has a plurality of paper discharge trays, and includes a sorting portion, a hole-punching portion, and a stapling portion. The sorting portion sorts and discharges a plurality of sheets, with the images formed thereon, to a plurality of paper discharge trays. The hole-punching portion punches the sheets. The stapling portion staples a plurality of sheets, with the images formed thereon, as a set.

Display portion 115 is a display such as a liquid crystal display (LCD), an organic electro-luminescence display (ELD) or the like, and displays an instruction menu for a user, information about acquired image data, and others. Operation portion 116, which is provided with a plurality of keys, accepts data input such as instructions, characters, and numerical characters, according to the key operations by the user. Operation portion 116 further includes a touch panel provided on display portion 115. Display portion 115 and operation portion 116 constitute operation panel 11.

Network I/F 117 is an interface for communication according to a communication protocol such as transmission control protocol (TCP) or user datagram protocol (UDP). Network I/F 117 communicates with external server 200 via network 3 and the Internet 5, and also communicates with other MFPs 100A to 100 D which are connected to network 3.

External storage device 118 is mounted with a compact disc read-only memory (CD-ROM) 119. CPU 111 is capable of accessing CD-ROM 119 via external storage device 118, and loading a program stored in CD-ROM 119 into RAM 113 for execution. It is noted that the program executed by CPU 111 is not restricted to the program stored in CD-ROM 119. It may be a program stored in another storage medium, or in HDD 114. Still alternatively, it may be a program written into HDD 114 by another computer connected to network 3 via network I/F 117.

It is noted that the storage medium for storing a program is not restricted to CD-ROM 119. It may be an optical disc (magneto-optical (MO) disc, mini disc (MD), digital versatile disc (DVD)), an IC card, an optical card, or a semiconductor memory such as a mask ROM, an erasable programmable ROM (EPROM), an electrically erasable and programmable ROM (EEPROM), or the like.

Facsimile portion 27 is connected to public switched telephone networks (PSTN), and transmits facsimile data to or receives facsimile data from the PSTN. Facsimile portion 27 converts the received facsimile data to print data which can be printed by image forming portion 24, and outputs the print data to image forming portion 24. This causes image forming portion 24 to form an image on a sheet of paper according to the facsimile data. Further, facsimile portion 27 converts the data stored in HDD 114 to facsimile data, and transmits the facsimile data to a facsimile machine connected to the PSTN.

Figure 4:
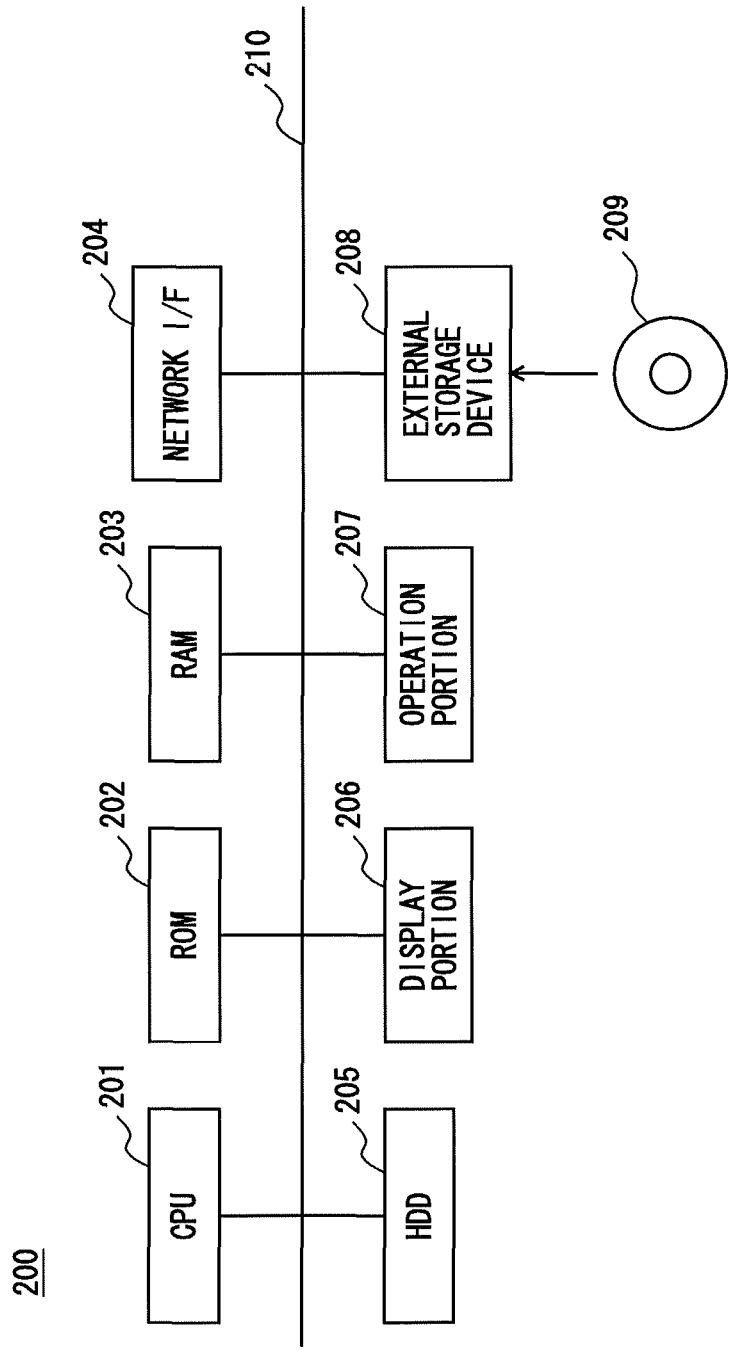
FIG. 4 is a block diagram showing, by way of example, the hardware configuration of an external server.

FIG. 4 is a block diagram showing, by way of example, the hardware configuration of the external server. Referring to FIG. 4, external server 200 includes: a CPU 201 which is responsible for overall control of external server 200; a ROM 202 which stores a program executed by CPU 201 and others; a RAM 203 used as a work area for CPU 201; a network I/F 204 which connects external server 200 to a network; a HDD 205 as a mass storage; a display portion 206; an operation portion 207 for accepting an input of an operation by a user; and an external storage device 208 which can be mounted with a CD-ROM 209.

External storage device 208 can be mounted with CD-ROM 209. CD-ROM 209 stores a program which can be executed by CPU 201. CPU 201 controls external storage device 208 to read a program from CD-ROM 209, and loads the read program into RAM 203 for execution.

The recording medium for storing the program is not restricted to CD-ROM 209. It may be a flexible disk, a cassette tape, an optical disk (MO, MD, DVD), an IC card, an optical card, or a semiconductor memory such as a mask ROM, an EPROM, an EEPROM, or the like. Further, CPU 201 may download a program from another computer connected to the Internet 5 and store the same in HDD 205, or the other computer may write a program into HDD 205, and the program thus stored in HDD 205 may be loaded into RAM 203 for execution by CPU 201. As used herein, the "program" includes, not only the program which CPU 201 can execute directly, but also a source program, a compressed program, an encrypted program, and others.

Figure 5:
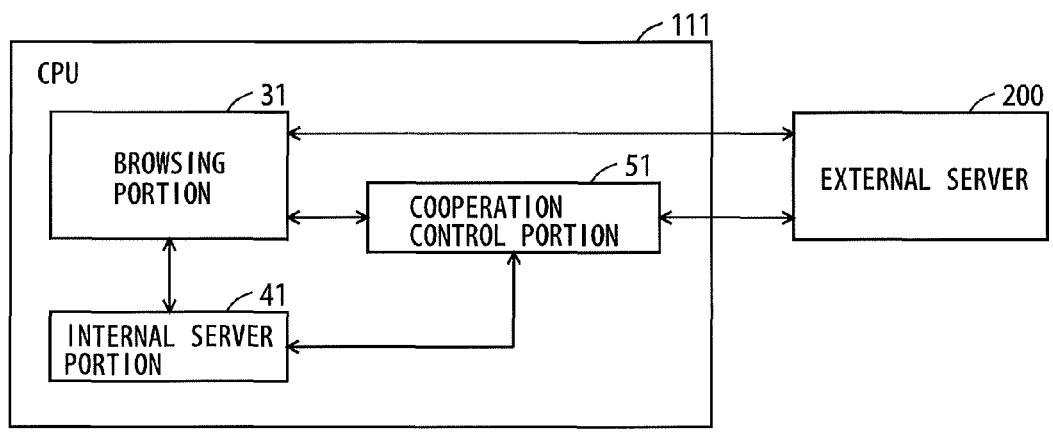
FIG. 5 is a block diagram showing, by way of example, the functions of a CPU included in the MFP according to a first embodiment of the present invention.

FIG. 5 is a block diagram showing, by way of example, the functions of a CPU included in the MFP according to the first embodiment. The functions shown in FIG. 5 are formed in CPU 111 included in MFP 100 as CPU 111 executes a program stored in ROM 112, HDD 114, or CD-ROM 119.

Referring to FIG. 5, CPU 111 includes: a browsing portion 31; an internal server portion 41; and a cooperation control portion 51. Browsing portion 31 is formed in CPU 111 as CPU 111 executes a browsing program. Internal server portion 41 is formed in CPU 111 as CPU 111 executes an IWS program for implementing the IWS function. Cooperation control portion 51 is formed in CPU 111 as CPU 111 executes an application cooperation program. The functions of browsing portion 31 and internal server portion 41 are well known in the art, and thus, a description thereof will not be provided here.

At the time when a user of MFP 100 installs an application cooperation program into MFP 100, an external server 200 predetermined for the application cooperation program is registered. More specifically, for the purposes of performing the data processing service provided by external server 200, a uniform resource locator (URL) 91 (see FIG. 6), i.e. the network address of a Web page including a scan instruction screen stored in external server 200, is stored in HDD 114. The URL of the Web page including the scan instruction screen has been registered in advance in the application cooperation program, and this URL is stored in HDD 114.

When the application cooperation program is installed into MFP 100, a button for causing CPU 111 to execute the application cooperation program is added to a menu screen. When a user designates in the menu screen the button for causing CPU 111 to execute the application cooperation program, CPU 111 executes the application cooperation program. When CPU 111 executes the application cooperation program, cooperation control portion 51 is formed in CPU 111.

Figure 6:
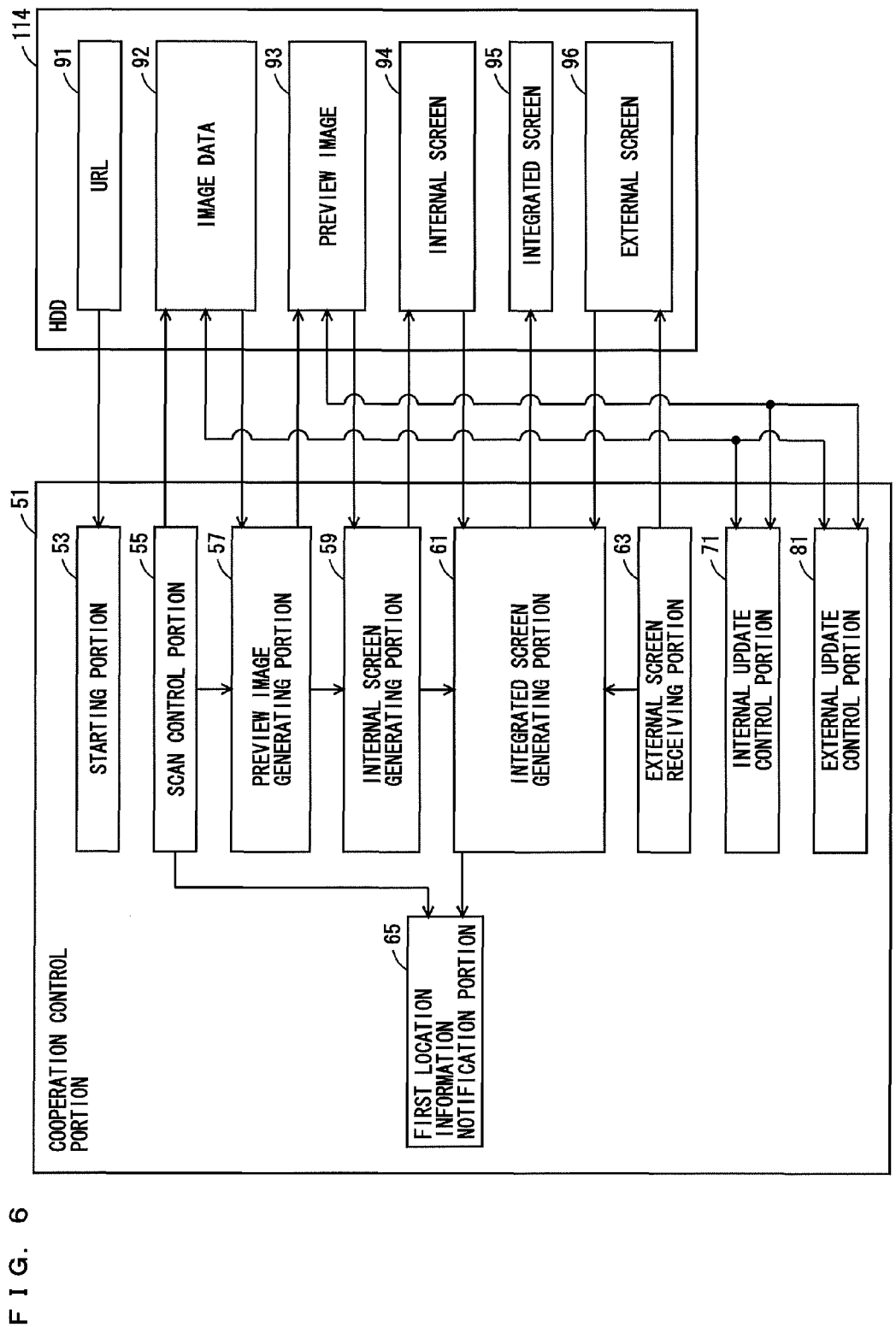
FIG. 6 shows, by way of example, the detailed functions of a cooperation control portion, together with data stored in a HDD, according to the first embodiment.

FIG. 6 shows, by way of example, the detailed functions of the cooperation control portion, together with data stored in HDD 114, according to the first embodiment. Referring to FIG. 6, cooperation control portion 51 includes: a starting portion 53; a scan control portion 55 which controls image reading portion 22; a preview image generating portion 57 which generates a preview image from scanned image data; an internal screen generating portion 59; an external screen receiving portion 63 which receives an external screen from external server 200; an integrated screen generating portion 61 which generates an integrated screen including an internal screen and an external screen; a first location information notification portion 65 which notifies external server 200 of the network address of the integrated screen; an internal update control portion 71; and an external update control portion 81.

Starting portion 53 starts browsing portion 31 to cause it to display a Web page including a scan instruction screen stored in external server 200. Specifically, starting portion 53 causes CPU 111 to execute a browsing program. This causes browsing portion 31 to be formed in CPU 111. Starting portion 53 reads a URL 91 stored in HDD 114, and outputs the read URL 91 to browsing portion 31. Browsing portion 31 in turn obtains the Web page specified by URL 91 received from starting portion 53, and displays the obtained Web page on display portion 115. The Web page specified by URL 91 is the scan instruction screen stored in external server 200.

The scan instruction screen includes a scan instruction button for a user to input into MFP 100 an instruction to read a document. The scan instruction button has associated therewith a CGI command, for informing external server 200 that a scan instruction operation has been accepted, and a transmission request command, for requesting transmission of a next screen. When the scan instruction button is designated, browsing portion 31 transmits the CGI command associated with the scan instruction button to external server 200 via network I/F 117, and subsequently transmits a next screen request to external server 200 via network I/F 117.

When external server 200 receives from MFP 100 the CGI command associated with the scan instruction button, external server 200 returns a scan instruction command to MFP 100, and it also transmits an external screen and screen information to MFP 100. The external screen and the screen information will be described later. The scan instruction command is described in an API of MFP 100 and includes an API command for causing MFP 100 to perform scanning.

When network I/F 117 receives the scan instruction command from external server 200, scan control portion 55 accepts the scan instruction command. When scan control portion 55 accepts the scan instruction command, scan control portion 55 controls image reading portion 22 to cause it to read a document, and obtains the image data output from image reading portion 22. Scan control portion 55 stores the obtained image data in HDD 114. As a result, image data 92 is stored in HDD 114. Further, scan control portion 55 outputs image data 92 stored in HDD 114 to preview image generating portion 57, and also outputs the network address (URL) of image data 92 stored in HDD 114 to first location information notification portion 65.

Preview image generating portion 57 generates a preview image from image data 92 stored in HDD 114. The preview image is an image to be included in an internal screen which will be described later, and has its size determined in accordance with the internal screen. Therefore, preview image generating portion 57 reduces image data 92 to the size determined in accordance with the internal screen, and stores the reduced image data as a preview image in HDD 114. As a result, a preview image 93 is stored in HDD 114. Preview image generating portion 57 outputs the file name of preview image 93 stored in HDD 114, to internal screen generating portion 59.

Internal screen generating portion 59 generates an internal screen on the basis of the screen information that is received from external server 200 together with the scan instruction command. The screen information is a style sheet such as a cascading style sheet (CSS), which information determines the size of the internal screen, character font size, background color, button color, and so on. The internal screen is described in a markup language, and includes a URL of preview image 93 and a button for instructing to perform image processing on the preview image. The button for instructing the image processing is associated with a CGI command. The CGI command is a CGI command executed by internal server portion 41, and is an API command of MFP 100. It is here assumed that the internal screen includes three buttons associated respectively with three API commands which instruct to perform image processing of rotating a preview image, reducing a preview image in size, and enlarging a preview image in size.

Internal screen generating portion 59 stores the generated internal screen in HDD 114. As a result, an internal screen 94 is stored in HDD 114. Further, internal screen generating portion 59 outputs the file name of internal screen 94 stored in HDD 114, to integrated screen generating portion 61.

When network I/F 117 receives an external screen transmitted from external server 200 together with the scan instruction command, external screen receiving portion 63 obtains the external screen. The external screen is described in a markup language, and includes a button for instructing to perform a data processing service provided by external server 200. The button for instructing to perform a data processing service is associated with a CGI command of external server 200. External screen receiving portion 63 stores the obtained external screen in HDD 114. As a result, an external screen 96 is stored in HDD 114. Further, external screen receiving portion 63 outputs the file name of external screen 96 stored in HDD 114, to integrated screen generating portion 61.

Integrated screen generating portion 61 receives the file name of the internal screen from internal screen generating portion 59, and receives the file name of the external screen from external screen receiving portion 63. Integrated screen generating portion 61 reads internal screen 94 and external screen 96 stored in HDD 114 to generate an integrated screen including the internal and external screens, and outputs the generated integrated screen to internal server portion 41. When receiving the integrated screen, internal server portion 41 stores the integrated screen in HDD 114, in the state where that can be output as a Web page. As a result, in HDD 114, an integrated screen 95 is stored as a Web page that internal server portion 41 is able to output. Integrated screen generating portion 61 obtains from internal server portion 41 the network address (URL) of integrated screen 95 stored in HDD 114, and outputs the obtained network address of integrated screen 95 to first location information notification portion 65.

First location information notification portion 65 receives the URL of image data 92 from scan control portion 55, and receives the URL of integrated screen 95 from integrated screen generating portion 61. First location information notification portion 65 outputs the URL of image data 92 and the URL of integrated screen 95 to external server 200 via network I/F 117.

When external server 200 receives the URL of integrated screen 95 transmitted from first location information notification portion 65, external server 200 transmits redirect information including the URL of integrated screen 95, to the apparatus that has issued a next screen request. The redirect information transmitted from external server 200 is received by network I/F 117. When browsing portion 31 receives the redirect information from network I/F 117, browsing portion 31 outputs a transmission request including the URL included in the redirect information. Here, the URL included in the redirect information is the URL of integrated screen 95 stored in HDD 114. Therefore, the transmission request includes the URL of integrated screen 95, and is output to internal server portion 41. When internal server portion 41 receives the transmission request, internal server portion 41 reads integrated screen 95 specified by the URL included in the transmission request, and outputs the screen to browsing portion 31. Browsing portion 31 displays integrated screen 95, input from internal server portion 41, on display portion 115. As a result, integrated screen 95 is displayed on display portion 115. The integrated screen includes internal screen 94 and external screen 96, wherein internal screen 94 includes a button for instructing internal server portion 41 to perform image processing, and external screen 96 includes a button for instructing to perform the data processing service provided by external server 200.

Figure 7:
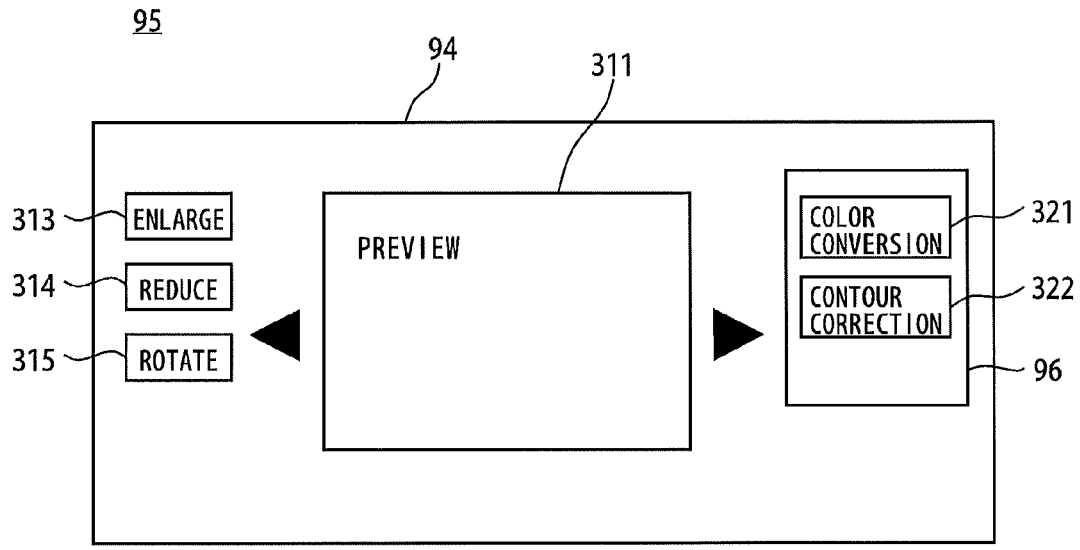
FIG. 7 shows an example of an integrated screen according to the first embodiment.

FIG. 7 shows an example of the integrated screen according to the first embodiment. Referring to FIG. 7, integrated screen 95 includes internal screen 94 and external screen 96. Internal screen 94 includes an area 311 for displaying a preview image, and buttons 313, 314, and 315 which instruct three types of image processing respectively. Button 313 is associated with a CGI command to instruct image processing of enlarging a preview image in size. Button 314 is associated with a CGI command to instruct image processing of reducing a preview image in size. Button 315 is associated with a CGI command to instruct image processing of rotating a preview image.

External screen 96 includes two buttons 321 and 322 which instruct two types of data processing respectively. Button 321 is associated with a CGI command to instruct data processing of changing the color of a preview image. Button 322 is associated with a CGI command to instruct data processing of correcting the contour of a preview image.

Returning to FIG. 6, a user can designate any one of buttons 313, 314, and 315 for instructing the image processing, included in internal screen 94, or buttons 321 and 322 for instructing the data processing services, included in external screen 96. When the user designates one of buttons 313, 314, and 315 in internal screen 94 to instruct the image processing, then browsing portion 31 outputs the CGI command associated with the designated button, 313, 314, or 315, to internal server portion 41. When the user designates one of buttons 321 and 322 in external screen 96, then browsing portion 31 outputs the CGI command associated with the designated button, 321 or 322, to external server 200 via network I/F 117.

<Image Processing by Internal Server>

When internal server portion 41 receives from browsing portion 31 the CGI command associated with the designated button, internal server portion 41 outputs an instruction to perform the image processing determined by the CGI command, to cooperation control portion 51. It is here assumed that the image processing is one of the image enlargement processing, image reduction processing, and image rotation processing.

Figure 8:
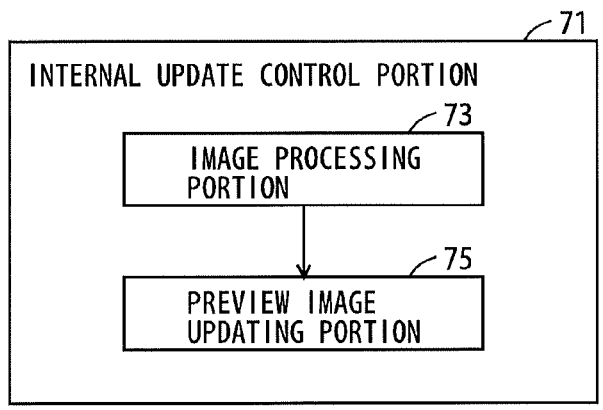
FIG. 8 shows, by way of example, the detailed functions of an internal update control portion.

FIG. 8 shows, by way of example, the detailed functions of the internal update control portion. Referring to FIG. 8, internal update control portion 71 includes an image processing portion 73 and a preview image updating portion 75.

When image processing portion 73 receives an instruction to perform image processing from internal server portion 41, image processing portion 73 performs the image processing determined by the input instruction on image data 92 stored in HDD 114, and updates the stored image data 92 with the processed image data 92. Here, the image processing is one of the image reduction processing, image enlargement processing, and image rotation processing. When the image processing is finished, image processing portion 73 outputs an update instruction to preview image updating portion 75.

When preview image updating portion 75 receives the update instruction, preview image updating portion 75 generates a preview image from the updated image data 92 stored in HDD 114, and updates the preview image 93 stored in HDD 114 with the generated preview image. Once preview image updating portion 75 has updated preview image 93, preview image updating portion 75 outputs an update complete signal to internal server portion 41. Internal server portion 41 reads integrated screen 95, and outputs the read integrated screen 95 to browsing portion 31. Integrated screen 95 includes the URL of preview image 93 in internal screen 94. At the time when browsing portion 31 displays integrated screen 95, preview image 93 has already been updated by internal update control portion 71. Therefore, integrated screen 95 including the updated preview image 93 is displayed on display portion 115.

<Data Processing by External Server>

External server 200 has already received the URL of image data 92 together with the URL of integrated screen 95, before receiving the CGI command transmitted from browsing portion 31 of MFP 100. When external server 200 receives the CGI command transmitted from browsing portion 31 of MFP 100, external server 200 obtains image data 92 from MFP 100 on the basis of the URL that has previously been received, and subjects the obtained image data to the data processing specified by the CGI command. It is here assumed that the data processing is color conversion processing or contour correction processing. External server 200 transmits, to MFP 100, a command that includes the URL and the processed image data and that requests MFP 100 to update the image data 92 specified by the URL with the processed image data. Further, when the update of image data 92 is finished, external server 200 transmits an update request to MFP 100.

Figure 9:
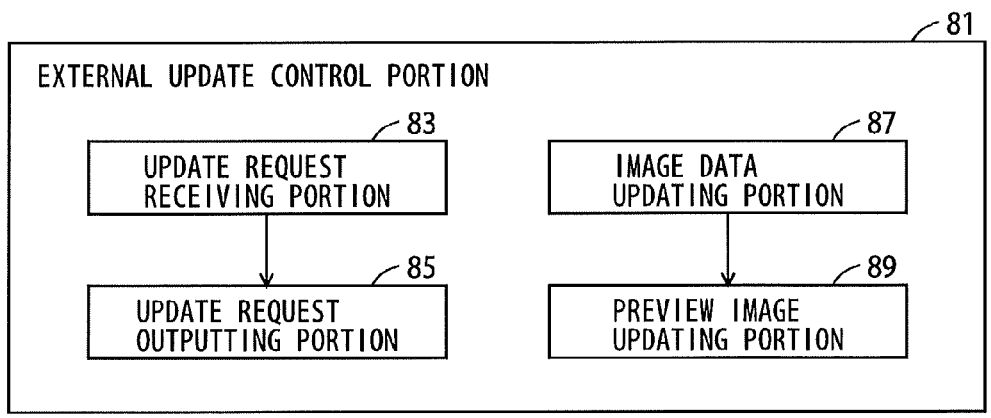
FIG. 9 shows, by way of example, the detailed functions of an external update control portion.

FIG. 9 shows, by way of example, the detailed functions of the external update control portion. Referring to FIG. 9, external update control portion 81 includes an update request receiving portion 83, an update request outputting portion 85, an image data updating portion 87, and a preview image updating portion 89. When image data updating portion 87 receives the URL of image data 92 from external server 200, image data updating portion 87 reads image data 92 from HDD 114, and transmits the same to external server 200. When image data updating portion 87 receives the URL and the processed image data from external server 200, image data updating portion 87 updates the image data 92 specified by the URL with the processed image data. As a result, the image data being stored in HDD 114 is updated with the image data processed by external server 200. When the image data is updated, image data updating portion 87 outputs an update instruction to preview image updating portion 89.

When preview image updating portion 89 receives the update instruction, preview image updating portion 89 generates a preview image from the updated image data 92 stored in HDD 114, and updates the preview image 93 being stored in HDD 114 with the generated preview image.

When network I/F 117 receives an update request transmitted from external server 200, update request receiving portion 83 obtains the update request and outputs the update request to update request outputting portion 85. When update request outputting portion 85 receives the update request, update request outputting portion 85 outputs the update request to browsing portion 31.

When browsing portion 31 receives the update request, browsing portion 31 outputs the update request to internal server portion 41. When receiving the update request, internal server portion 41 reads integrated screen 95 from HDD 114, and outputs the read integrated screen 95 to browsing portion 31. Integrated screen 95 includes the URL of preview image 93 in internal screen 94. At the time when browsing portion 31 displays integrated screen 95, preview image 93 has already been updated by preview image updating portion 89 in external update control portion 81. Therefore, integrated screen 95 being displayed on display portion 115 includes preview image 93 that has been updated after being processed by external server 200.

Figure 10:
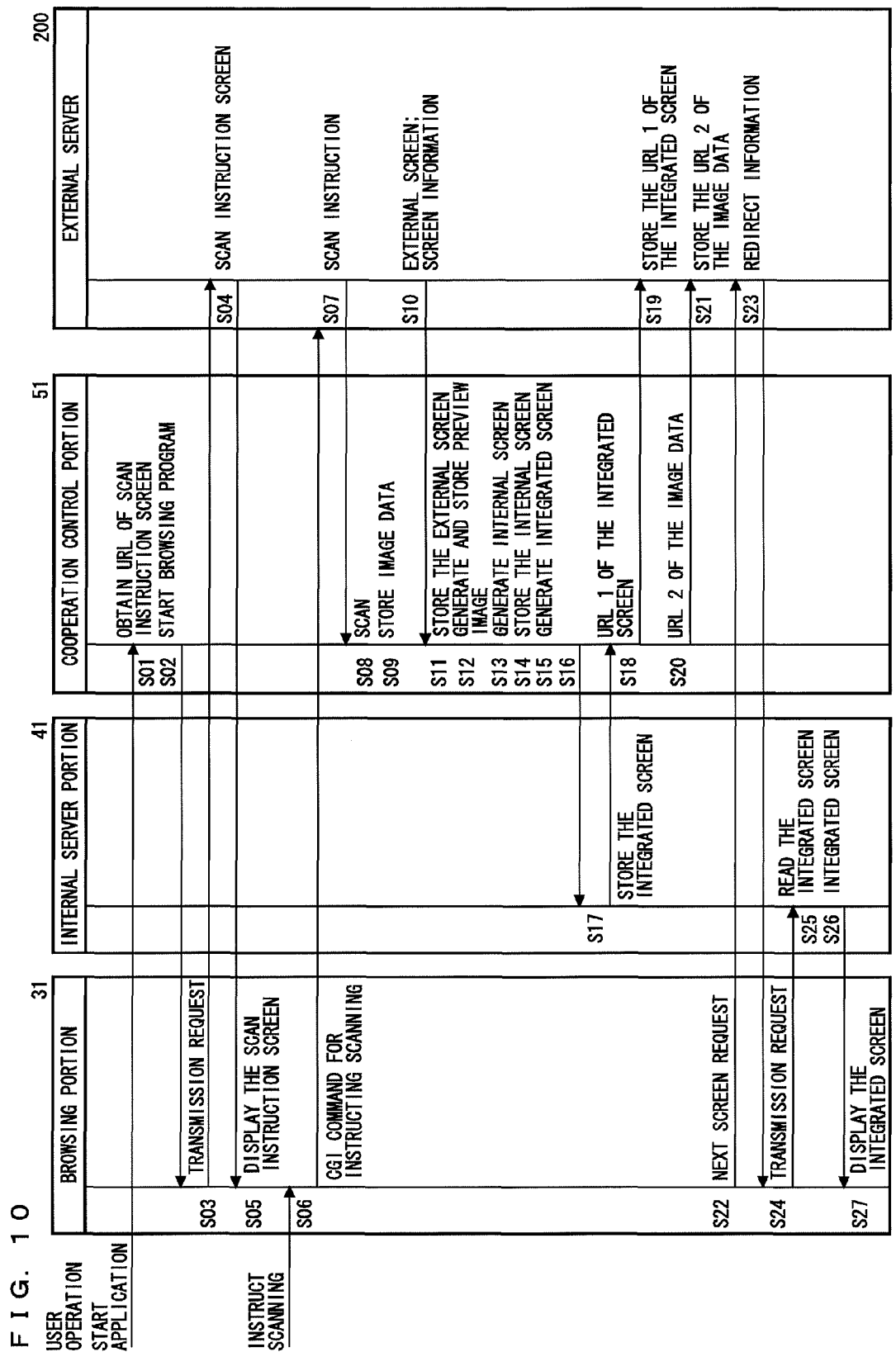
FIGS. 10 and 11 are flowcharts illustrating a relation of the process flows in a browsing portion, internal server portion, cooperation control portion, and external server according to the first embodiment.

FIG. 10 is a first flowchart illustrating a relation of the process flows of the browsing portion, internal server portion, cooperation control portion, and external server according to the first embodiment. Referring to FIG. 10, when a user starts an application cooperation program, cooperation control portion 51, which is a task of executing the application cooperation program, is formed in CPU 111. When cooperation control portion 51 is started by a user, cooperation control portion 51 reads URL 91 of a scan instruction screen from HDD 114 (step S01). Cooperation control portion 51 then starts a browsing program using the read URL 91 as an argument (step S02). As the browsing program is started, browsing portion 31, which is a task of executing the browsing program, is formed in CPU 111.

Browsing portion 31 transmits a transmission request including URL 91 that is input as an argument from cooperation control portion 51, to external server 200 via network I/F 117 (step S03). When external server 200 receives the transmission request, external server 200 returns the scan instruction screen specified by URL 91 (step S04). When browsing portion 31 receives the scan instruction screen returned from external server 200, browsing portion 31 displays the received scan instruction screen on display portion 115 (step S05).

When the user designates the scan instruction button included in the scan instruction screen displayed on display portion 115, browsing portion 31 accepts the scan instruction, and transmits the CGI command that is associated with the designated scan instruction button, to external server 200 via network I/F 117 (step S06).

When external server 200 receives the CGI command associated with the scan instruction button from MFP 100, external server 200 returns a scan instruction command to MFP 100 (step S07). The scan instruction command, which is described in an API of MFP 100, is an API command for causing MFP 100 to perform scanning.

External server 200 then transmits an external screen and screen information to MFP 100 (step S10). The external screen, which is described in a markup language, includes a button for instructing to perform a data processing service provided by external server 200. The button for instructing to perform the data processing service is associated with a CGI command of external server 200.

When network I/F 117 receives the scan instruction command from external server 200, cooperation control portion 51 controls image reading portion 22 to cause it to read a document, and obtains the image data output from image reading portion 22 (step S08). Cooperation control portion 51 then stores the obtained image data in HDD 114 (step S09). This causes image data 92 to be stored in HDD 114.

Next, when network I/F 117 receives the external screen and the screen information from external server 200, cooperation control portion 51 stores the external screen in HDD 114 (step S11). Further, cooperation control portion 51 generates a preview image from image data 92 stored in HDD 114, and stores the generated preview image in HDD 114 (step S12). This causes preview image 93 to be stored in HDD 114. The preview image, which is an image included in an internal screen, has its size determined in accordance with the screen information received in step S11. Therefore, preview image generating portion 57 reduces image data 92 to the size determined in accordance with the internal screen, and stores the reduced image data as a preview image in HDD 114.

In the following step S13, cooperation control portion 51 generates an internal screen on the basis of the screen information, and stores the generated internal screen in HDD 114 (step S14). This causes internal screen 94 to be stored in HDD 114. The screen information is a style sheet such as a CSS, which information determines the size of the internal screen, character font size, background color, button color, and the like. The internal screen is described in a markup language, and includes the URL of preview image 93 and a button for instructing the image processing on the preview image.

Next, cooperation control portion 51 reads the external screen stored in step S11 and the internal screen stored in step S14, to generate an integrated screen that includes the external and internal screens (step S15). Cooperation control portion 51 then outputs the generated integrated screen to internal server portion 41 (step S16).

Internal server portion 41 stores the integrated screen received from cooperation control portion 51, into HDD 114 as a Web page, and outputs the URL of integrated screen 95 to cooperation control portion 51 (step S17). Cooperation control portion 51 then transmits URL 1 of integrated screen 95 received from internal server portion 41, to external server 200 via network I/F 117 (step S18). Furthermore, cooperation control portion 51 transmits URL 2 of image data 92 stored in HDD 114, to external server 200 via network I/F 117 (step S20).

External server 200 stores the received URL 1 of integrated screen 95 (step S19), and also stores the received URL 2 of image data 92 (step S21). After browsing portion 31 transmitted the CGI command for instructing scanning in step S06, when browsing portion 31 transmits a next screen request in step S22, external server 200 returns redirect information including the URL 1 of integrated screen 95, to browsing portion 31 that issued the next screen request (step S23). The redirect information transmitted from external server 200 is received by browsing portion 31. When receiving the redirect information through network I/F 117, browsing portion 31 outputs a transmission request including the URL included in the redirect information, to internal server portion 41 (step S24). Here, the URL included in the redirect information is the URL1 of integrated screen 95 stored in HDD 114. Therefore, the transmission request includes the URL1 of integrated screen 95 and is output to internal server portion 41. When internal server portion 41 receives the transmission request, internal server portion 41 reads from HDD 114 integrated screen 95 specified by the URL1 included in the transmission request (step S25), and outputs the read integrated screen to browsing portion 31 (step S26).

Browsing portion 31 displays integrated screen 95 input from internal server portion 41, on display portion 115 (step S27). This causes integrated screen 95 to be displayed on display portion 115. The integrated screen includes internal screen 94 and external screen 96. Internal screen 94 includes a button for instructing the image processing. External screen 96 includes a button for instructing to perform the data processing service provided by external server 200.

Figure 11:
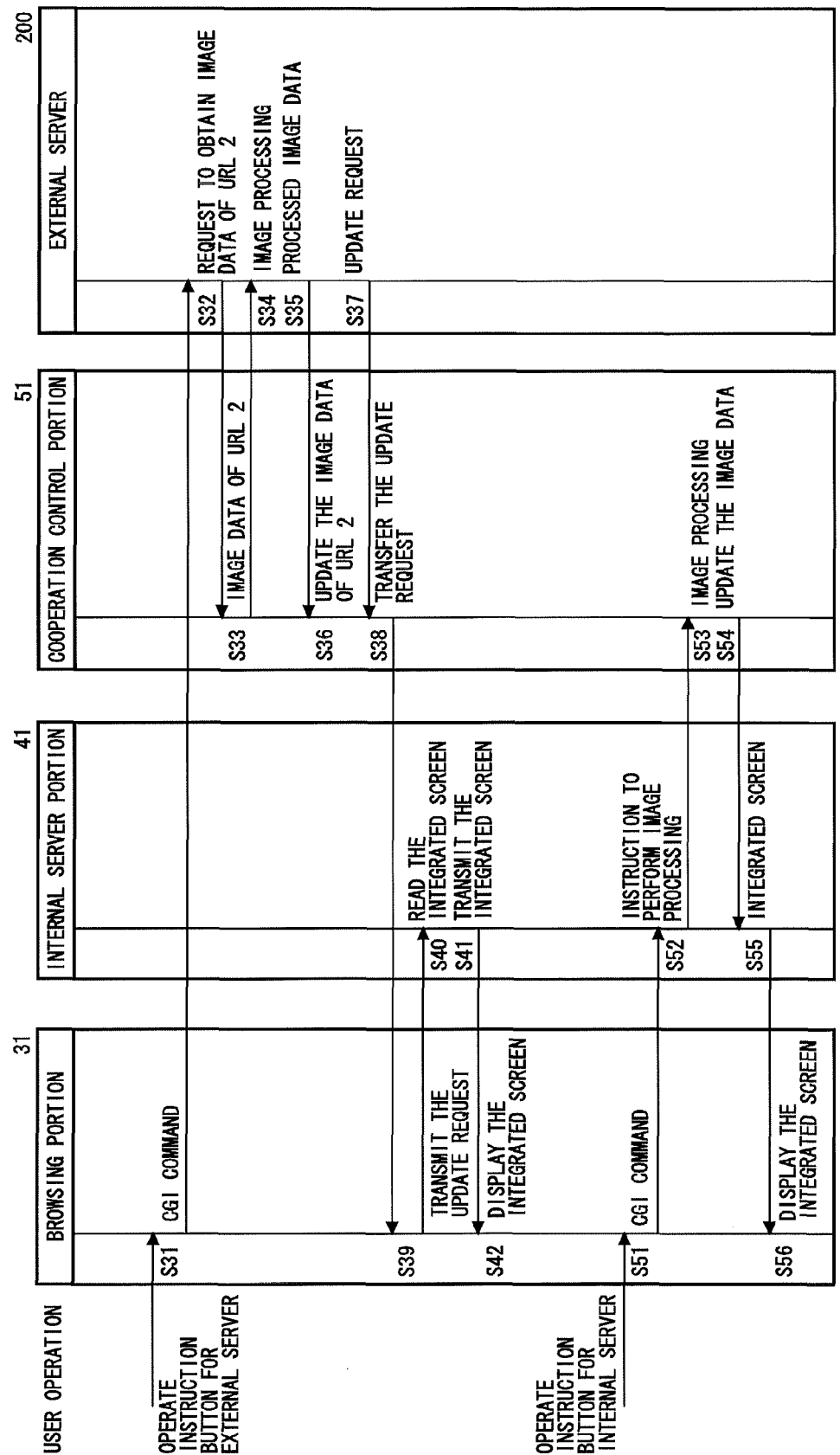

FIG. 11 is a second flowchart illustrating a relation of the process flows of the browsing portion, internal server portion, cooperation control portion, and external server according to the first embodiment. Referring to FIG. 11, when a user designates one of instruction buttons 321 and 322 included in external screen 96 in integrated screen 95 being displayed on display portion 115, browsing portion 31 transmits the CGI command associated with the designated button, to external server 200 via network I/F 117 (step S31).

When external server 200 receives the CGI command from browsing portion 31, external server 200 requests cooperation control portion 51 in MFP 100 to transmit the image data of URL 2 (step S32). When cooperation control portion 51 receives the transmission request including the URL 2, cooperation control portion 51 reads image data 92 specified by the URL 2 from HDD 114, and returns the image data to external server 200 (step S33). When receiving the image data, external server 200 subjects the received image data to the data processing specified by the CGI command received in step S32 (step S34). Here, the data processing is color conversion processing or contour correction processing. External server 200 transmits to MFP 100 a command that includes the URL 2 and the processed image data and that requests the process of updating the image data 92 specified by the URL 2 with the processed image data (step S35), and then transmits an update request to MFP 100 (step S37).

Cooperation control portion 51 updates the image data 92 specified by the URL 2 received from external server 200, with the processed image data 92 (step S36). Cooperation control portion 51 then transfers the update request received from external server 200, to browsing portion 31 (step S38).

When browsing portion 31 receives the update request from cooperation control portion 51, browsing portion 31 updates integrated screen 95 that is being displayed at that time (step S39). Specifically, browsing portion 31 outputs the update request to internal server portion 41, which has transmitted the integrated screen 95 displayed at that time. When internal server portion 41 receives the update request, internal server portion 41 reads integrated screen 95 being stored in HDD 114 (step S40), and outputs the read integrated screen 95 to browsing portion 31 (step S41).

Browsing portion 31 displays integrated screen 95 received from internal server portion 41, on display portion 115 (step S42). At the time when browsing portion 31 displays integrated screen 95, image data 92 stored in HDD 114 has already been updated with the image data processed by external server 200. Thus, the preview image has been generated from the updated image data. Accordingly, integrated screen 95 displayed on display portion 115 includes preview image 93 that has been updated after being subjected to data processing by external server 200.

Next, when a user designates one of instruction buttons 313, 314, 315 included in internal screen 94 in integrated screen 95 that is being displayed on display portion 115, browsing portion 31 outputs the CGI command associated with the designated button, to internal server portion 41 (step S51).

When internal server portion 41 receives the CGI command associated with the designated button from browsing portion 31, internal server portion 41 outputs the instruction to perform the image processing determined by the CGI command, to cooperation control portion 51 (step S52). Here, the image processing is one of the image enlargement processing, image reduction processing, and image rotation processing.

When cooperation control portion 51 receives the instruction to perform the image processing from internal server portion 41, cooperation control portion 51 performs the image processing determined by the input instruction on image data 92 stored in HDD 114 (step S53), and updates the stored image data 92 with the processed image data 92 (step S54). Here, the image processing is one of the image reduction processing, image enlargement processing, and image rotation processing. The image processing performed on image data 92 includes an update of the preview image as well. More specifically, a preview image is generated from the updated image data 92 stored in HDD 114, and preview image 93 being stored in HDD 114 is updated with the generated preview image. When the image processing is finished, cooperation control portion 51 outputs an update complete signal to internal server portion 41 (step S54).

When internal server portion 41 receives the update complete signal, internal server portion 41 reads integrated screen 95 from HDD 114, and outputs the read integrated screen 95 to browsing portion 31 (step S55). Integrated screen 95 includes the URL of preview image 93 in internal screen 94.

When browsing portion 31 receives integrated screen 95 from internal server portion 41, browsing portion 31 displays the integrated screen on display portion 115 (step S56). At the time when browsing portion 31 displays integrated screen 95, preview image 93 has already been updated by cooperation control portion 51 in step S54. Therefore, integrated screen 95 including the updated preview image 93 is displayed on display portion 115.

In application cooperation system 1 of the first embodiment, image data 92 which has been read from a document by image reading portion 22 included in MFP 100 is stored in HDD 114, and image data 92 stored in HDD 114 is subjected to image processing in either MFP 100 or external server 200, and then updated. In application cooperation system 1, when a user designates a start key included in operation portion 116, an image of image data 92 being processed is formed on a sheet of paper by image forming portion 24, and the sheet on which the image of image data 92 has been formed is output. It is noted that application cooperation system 1 may be additionally provided with the function of outputting image data 92. In this case, as in the case of the scan instruction screen, an output instruction screen may be transmitted from external server 200 to MFP 100, to cause MFP 100 to perform processing. The outputting processing in this case includes: image forming by image forming portion 24; data storage by which the image data is stored in HDD 114; and data transmission such as e-mail transmission by which an e-mail message with a preview image attached thereto is transmitted via network I/F 117, or file transfer by which a preview image is transmitted to another computer or any of the other MFPs 100A to 100D via network I/F 117. Further, image data 92 may be transmitted from MFP 100 to external server 200, to cause external server 200 to perform the processing of outputting image data 92.

As described above, according to application cooperation system 1 of the first embodiment, when external server 200 receives a transmission request requesting transmission of a next screen from browsing portion 31 in MFP 100, external server 200 returns redirect information including the network address of an integrated screen to browsing portion 31 (step S23). Browsing portion 31 in turn transmits a transmission request of the integrated screen to internal server portion 41 (step S24). Internal server portion 41 then outputs the integrated screen to browsing portion 31 (step S26), and the integrated screen is displayed by browsing portion 31 (step S27). Integrated screen 95 includes internal screen 94 and external screen 96, wherein internal screen 94 includes a CGI command (internal control command) for causing internal server portion 41 to perform predetermined processing, and external screen 96 includes a CGI command (external control command) for causing the external server to perform predetermined processing. Therefore, a user can use integrated screen 95 to instruct either internal server portion 41 or external server 200 to perform processing on image data. At this time, the user is able to cause either MFP 100 or external server 200 to perform processing on image data, without a concern as to whether the processing will be performed by MFP 100 or external server 200.

Cooperation control portion 51 includes first location information notification portion 65 which transmits the URL indicating the location of image data 92 stored in HDD 114. When external server 200 receives a CGI command (external control command) from browsing portion 31, external server 200 obtains image data 92 specified by the received URL of image data (step S32), performs the image processing specified by the received CGI command (external control command) on image data 92 (step S34), updates the image data with the processed image data (step S35), and outputs an update request to browsing portion 31 after image data 92 has been updated (step S37). This enables the image data processed by external server 200 to be displayed on MFP 100.

Furthermore, when a CGI command (internal control command) is transmitted from browsing portion 31 to internal server portion 41, cooperation control portion 51 performs the image processing specified by the received CGI command (internal control command) on image data 92 specified by internal screen 94 (step S53), and updates the image data with the processed image data (step S54). After the image data is updated by cooperation control portion 51, internal server portion 41 returns the integrated screen including the updated image data to browsing portion 31 (step S55). This enables the image data processed by MFP 100 to be displayed on MFP 100.

Still further, internal screen generating portion 59 receives the screen information from external server 200, and generates an internal screen in accordance with the screen information (step S13). This enables the internal screen to have the same display modes such as character size, color, background color, and the like as those of the external screen. It is thus possible to provide integrated screen 95 in which internal screen 94 and external screen 96 are so well integrated that they are indistinguishable from each other.

Second Embodiment

In application cooperation system 1 of the first embodiment, MFP 100 generates an integrated screen and the integrated screen is stored in HDD 114 in MFP 100. An application cooperation system according to the second embodiment of the present invention is different from that of the first embodiment in that external server 200 generates an integrated screen and the integrated screen is stored in external server 200. In the following, an application cooperation system 1A of the second embodiment will be described by primarily focusing on the differences from application cooperation system 1 of the first embodiment.

The hardware configuration of application cooperation system 1A according to the second embodiment is identical to that shown in FIGS. 1 to 4.

FIG. 12 shows, by way of example, the functions of CPU 111 included in the MFP according to the second embodiment. The functions shown in FIG. 12 are different from those shown in FIG. 5 in that cooperation control portion 51 has been changed to a cooperation control portion 51A.

Figure 13:
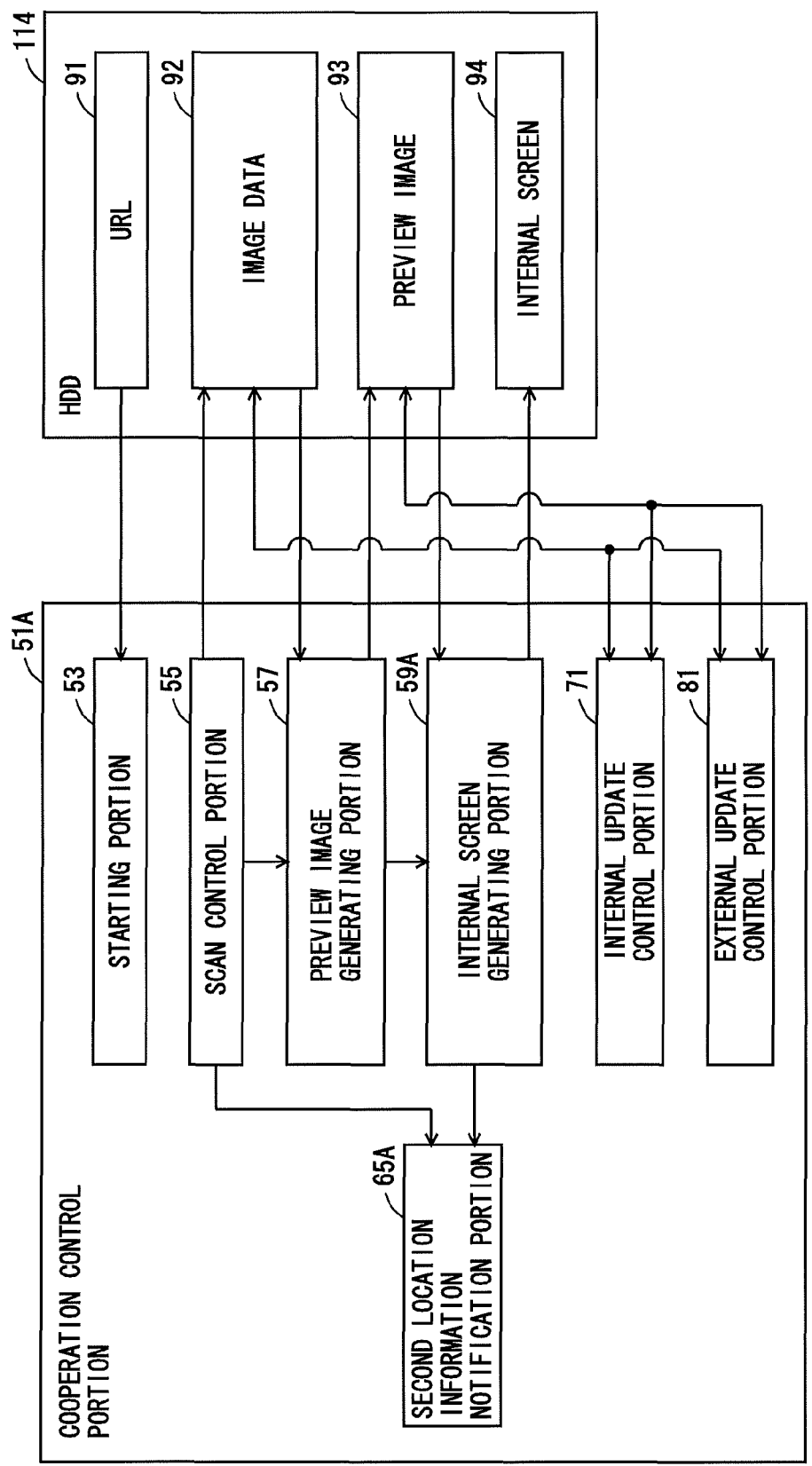
FIG. 13 shows, by way of example, the detailed functions of a cooperation control portion, together with data stored in a HDD, according to the second embodiment.

FIG. 13 shows, by way of example, the detailed functions of the cooperation control portion, together with data stored in HDD 114, according to the second embodiment. Referring to FIG. 13, cooperation control portion 51A of the second embodiment is different from cooperation control portion 51 in FIG. 6 in that first location information notification portion 65 and internal screen generating portion 59 have been changed to a second location information notification portion 65A and an internal screen generating portion 59A, respectively, and that integrated screen generating portion 61 and external screen receiving portion 63 have been deleted. Further, integrated screen 95 and external screen 96 are not stored in HDD 114. The other functions are identical to those shown in FIG. 6, and thus, the description thereof will not be repeated here.

Internal screen generating portion 59A generates an internal screen on the basis of the screen information received from external server 200 together with the scan instruction command. The screen information is a style sheet, such as a CSS, which determines the size of the internal screen, character font size, background color, button color, and the like. The internal screen, described in a markup language, includes the URL of preview image 93 and a button for instructing image processing on the preview image. The button for instructing the image processing is associated with a CGI command. The CGI command is a CGI command executed by internal server portion 41, and is an API command of MFP 100. It is here assumed that the internal screen includes three buttons associated respectively with three API commands which instruct to perform image processing of rotating a preview image, reducing a preview image in size, and enlarging a preview image in size.

Internal screen generating portion 59A outputs the generated internal screen to internal server portion 41. Internal server portion 41 stores the internal screen received from internal screen generating portion 59A, into HDD 114 as a Web page, and outputs the URL of internal screen 94 to internal screen generating portion 59A. This causes internal screen 94 to be stored in HDD 114 as a Web page that internal server portion 41 is able to output. Further, internal screen generating portion 59A outputs the URL of internal screen 94 received from internal server portion 41, to second location information notification portion 65A.

Second location information notification portion 65A receives the URL of image data 92 from scan control portion 55, and receives the URL of internal screen 94 from internal screen generating portion 59A. Second location information notification portion 65A transmits the URL of image data 92 and the URL of internal screen 94 to external server 200 via network I/F 117.

Figure 14:
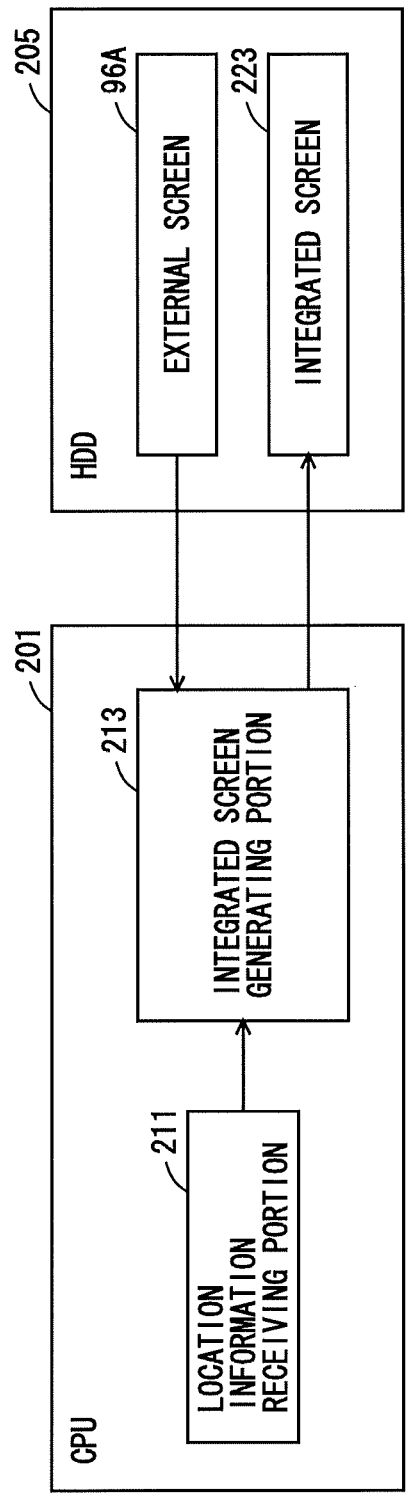
FIG. 14 is a block diagram showing, by way of example, the functions of a CPU included in the external server, together with data stored in a HDD, according to the second embodiment.

FIG. 14 is a block diagram showing, by way of example, the functions of a CPU included in the external server, together with data stored in the HDD, according to the second embodiment. Referring to FIG. 14, a CPU 201 included in external server 200 includes a location information receiving portion 211 and an integrated screen generating portion 213. An external screen 96A is stored in advance in HDD 205. When network I/F 204 receives the URL of image data 92 and the URL of internal screen 94 from MFP 100, location information receiving portion 211 accepts them. Location information receiving portion 211 outputs the received URL of image data 92 and the received URL of internal screen 94 to integrated screen generating portion 213.

Integrated screen generating portion 213 reads external screen 96A stored in advance in HDD 205, generates an integrated screen 223 from external screen 96A and the URL of internal screen 94 received from location information receiving portion 211, and stores the generated integrated screen in HDD 205. Integrated screen 223 includes external screen 96A, and also includes an inline frame (I frame) which is an area for displaying internal screen 94. In the I frame included in integrated screen 223, the URL of internal screen 94 received from location information receiving portion 211 is set such that internal screen 94 is displayed in the I frame.

FIG. 15 shows an example of the integrated screen according to the second embodiment. Referring to FIG. 15, integrated screen 223 includes external screen 96A, and an I frame 94A for displaying internal screen 94 therein. FIG. 15 indicates the state where internal screen 94 is being displayed in I frame 94A. Internal screen 94 includes an area 311 for displaying a preview image, and buttons 313, 314, and 315 for instructing three types of image processing, respectively. Area 311 and buttons 313, 314, and 315 are all displayed in I frame 94A. Button 313 is associated with a CGI command for instructing the image processing of enlarging a preview image in size. Button 314 is associated with a CGI command for instructing the image processing of reducing a preview image in size. Button 315 is associated with a CGI command for instructing the image processing of rotating a preview image.

External screen 96A includes buttons 321 and 322 for instructing two types of data processing. Button 321 is associated with a CGI command for instructing the data processing of changing the color of a preview image. Button 322 is associated with a CGI command for instructing the data processing of correcting the contour of a preview image.

Figure 16:
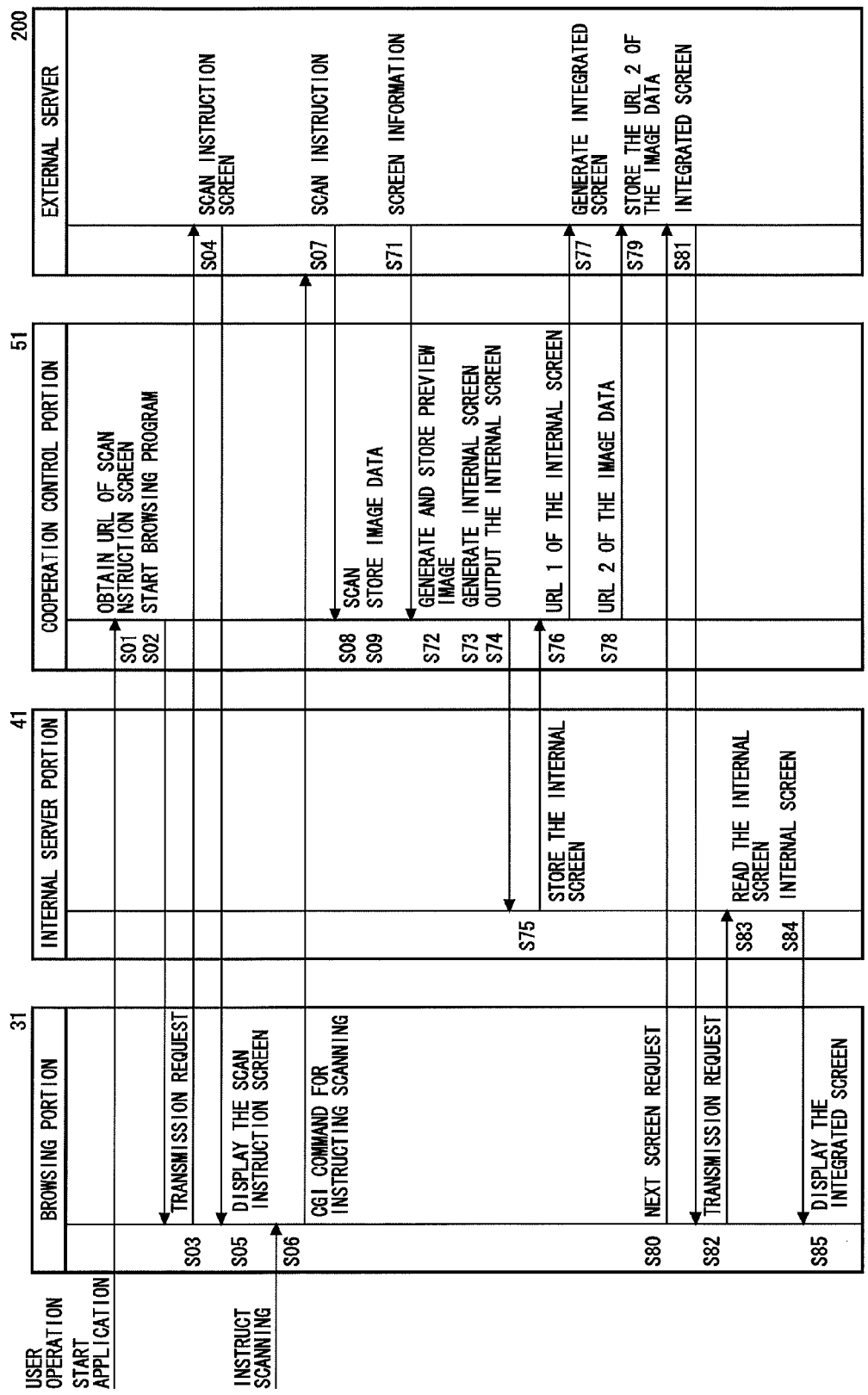

FIG. 16 is a first flowchart illustrating a relation of the process flows of the browsing portion, internal server portion, cooperation control portion, and external server according to the second embodiment. The flowchart in FIG. 16 is different from the flowchart in FIG. 10 in that steps S10 to S27 have been changed to steps S71 to S85. Steps S01 to S09 are identical to those shown in FIG. 10, and therefore, the description thereof will not be repeated here.

After external server 200 returned the scan instruction command to MFP 100 in step S07, external server 200 transmits screen information to MFP 100 (step S71). The screen information is a style sheet such as a CSS, which determines the size of the internal screen, character font size, background color, button color, and the like.

When network I/F 117 receives the screen information from external server 200, cooperation control portion 51 generates a preview image from image data 92 stored in HDD 114, and stores the generated preview image in HDD 114 (step S72). This causes a preview image 93 to be stored in HDD 114. The preview image is an image included in the internal screen, and has its size determined according to the screen information received from external server 200. Therefore, preview image generating portion 57 reduces image data 92 to the size determined by the screen information, and stores the reduced image data as preview image 93 in HDD 114.

In the following step S73, cooperation control portion 51 generates an internal screen on the basis of the screen information. Cooperation control portion 51 then outputs the generated internal screen to internal server portion 41 (step S74). Internal server portion 41 stores the internal screen received from cooperation control portion 51, into HDD 114 as a Web page, and also outputs the URL of internal screen 94 to cooperation control portion 51 (step S75). This causes internal screen 94 to be stored in HDD 114. The internal screen, described in a markup language, includes the URL of preview image 93 and a button for instructing the image processing on the preview image.

Next, cooperation control portion 51 transmits the URL 1 of internal screen 94 received from internal server portion 41, to external server 200 via network I/F 117 (step S76). Further, cooperation control portion 51 transmits the URL 2 of image data 92 stored in HDD 114, to external server 200 via network I/F 117 (step S78).

External server 200 generates an integrated screen in which the received URL 1 of internal screen 94 is included in the I frame (step S77). Further, external server 200 stores the received URL 2 of image data 92 (step S79). After browsing portion 31 transmitted the CGI command for instructing scanning in step S06, when browsing portion 31 transmits a next screen request (step S80), external server 200 returns the integrated screen 223 generated in step S77, to browsing portion 31 that has issued the next screen request (step S81). The integrated screen transmitted by external server 200 includes the I frame for displaying therein the internal screen specified by the URL 1. Therefore, browsing portion 31 outputs a transmission request including the URL 1, to internal server portion 41 (step S82).

When internal server portion 41 receives the transmission request including the URL 1, internal server portion 41 reads from HDD 114 internal screen 94 specified by the URL 1 (step S83), and outputs the read internal screen 94 to browsing portion 31 (step S84). When browsing portion 31 receives internal screen 94 from internal server portion 41, browsing portion 31 displays integrated screen 223, received from external server 200 in step S81, on display portion 115, while displaying internal screen 94 within the I frame portion in integrated screen 223 (step S85). This causes integrated screen 223 including internal screen 94 to be displayed on display portion 115. Integrated screen 223 includes internal screen 94 and external screen 96A, wherein internal screen 94 includes a preview image and a button for instructing image processing, and external screen 96A includes a button for instructing to perform the data processing service provided by external server 200.

FIG. 17 is a second flowchart illustrating a relation of the process flows of the browsing portion, internal server portion, cooperation control portion, and external server according to the second embodiment. The flowchart in FIG. 17 is different from the flowchart in FIG. 11 in that steps S40 to S42, S55, and S56 have been changed to steps S40A to S42A, S55A, and S56A, respectively. The other steps are identical to those in FIG. 11, and thus, the description thereof will not be repeated here.

When internal server portion 41 receives the update request from browsing portion 31, internal server portion 41 reads internal screen 94 from HDD 114 in step S40A. Internal server portion 41 then returns the read internal screen 94 to browsing portion 31 (step S41A).

Browsing portion 31 updates the I frame 94A in integrated screen 223, which is being displayed on display portion 115, with internal screen 94 received from internal server portion 41 (step S42A). At the time when browsing portion 31 displays internal screen 94 in the I frame 94A in integrated screen 223, image data 92 stored in HDD 114 has already been updated with the image data processed by external server 200, and thus, preview image 93 has been generated from the updated image data. Accordingly, integrated screen 223 displayed on display portion 115 includes preview image 93 that has been updated after external server 200 had performed the data processing.

Next, when a user designates one of instruction buttons 313, 314, and 315 included in internal screen 94 in integrated screen 223 that is being displayed on display portion 115, browsing portion 31 outputs the CGI command associated with the designated button, to internal server portion 41 (step S51).

When internal server portion 41 receives the CGI command associated with the designated button from browsing portion 31, internal server portion 41 outputs an instruction to perform the image processing determined by the CGI command, to cooperation control portion 51 (step S52). Here, the image processing is one of the image enlargement processing, image reduction processing, and image rotation processing.

When cooperation control portion 51 receives the instruction to perform the image processing from internal server portion 41, cooperation control portion 51 performs the image processing determined by the input instruction on image data 92 stored in HDD 114 (step S53), and updates the stored image data 92 with the processed image data 92 (step S54). The image processing performed on image data 92 includes an update of the preview image as well. More specifically, a preview image is generated from the updated image data 92 stored in HDD 114, and preview image 93 being stored in HDD 114 is updated with the generated preview image. When the image processing is finished, cooperation control portion 51 outputs an update complete signal to internal server portion 41 (step S54).

When internal server portion 41 receives the update complete signal, internal server portion 41 reads internal screen 94 from HDD 114, and outputs the read internal screen 94 to browsing portion 31 (step S55A).

When browsing portion 31 receives internal screen 94 from internal server portion 41, browsing portion 31 updates the I frame 94A in integrated screen 223 that is being displayed on display portion 115, with the received internal screen 94 (step S56A). At the time when browsing portion 31 updates integrated screen 223, preview image 93 has already been updated by cooperation control portion 51. Therefore, integrated screen 223 including the updated preview image 93 is displayed on display portion 115.

According to application cooperation system 1A of the second embodiment, when external server 200 receives a transmission request requesting transmission of a next screen from browsing portion 31 in MFP 100, external server 200 returns the integrated screen to browsing portion 31 (step S81). Accordingly, browsing portion 31 displays integrated screen 223. In integrated screen 223, a command to transmit a transmission request including the URL of internal screen 94 has been described so as to allow internal screen 94 to be displayed in the I frame 94A (i.e. partial display area). Therefore, browsing portion 31 transmits a transmission request of the internal screen to internal server portion 41 (step S82), and displays internal screen 94 received from internal server portion 41 in the I frame 94A. Integrated screen 223 includes internal screen 94 and external screen 96A, wherein internal screen 94 includes a CGI command (internal control command) for causing internal server portion 41 to perform predetermined processing, and external screen 96A includes a CGI command (external control command) for causing external server 200 to perform predetermined processing. Therefore, a user can use integrated screen 223 to instruct either internal server portion 41 or external server 200 to perform processing. At this time, the user is able to cause either MFP 100 or external server 200 to perform processing, without a concern as to whether the processing will be performed by MFP 100 or external server 200.

In the first and second embodiments described above, when data processing is performed in external server 200, the process target is image data 92 stored in MFP 100. Alternatively, the process target may be preview image 93. In this case, preview image generating portion 57 may be configured to update the image data 92 stored in HDD 114 with the preview image 93, and preview image 93 may be processed in place of image data 92. Preview image 93 corresponds to image data 92 reduced in size. This means that preview image 93 has a smaller amount of data than image data 92. Accordingly, when preview image 93 is transmitted between MFP 100 and external server 200 via network 3 to cause external server 200 to process the preview image (steps S34 and S35), the load on network 3 can be decreased with the smaller amount of data of the preview image. In this case, the data to be subjected to image processing in cooperation control portion 51 (step S53) is preview image 93, and the data to be output after being processed by the application operating system is also preview image 93.

While application cooperation systems 1 and 1A have been described in the above embodiments, the present invention may of course be understood as an application cooperation method or an application cooperation program for causing a computer to execute the processing shown in FIGS. 10, 11, 16, and 17.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An application cooperation system comprising:
a scanner configured to read a document to output scanned image data;
a memory configured to store a page described in a markup language;
a browser configured to receive a request for a page described in the markup language and display the page received in response to said request;
a first processor configured to:
function as an internal server to output the page stored in said memory in response to a request from said browser; and
cause said browser, said internal server, and an external server to cooperate with each other by:
starting said browser and causing said browser to display a page including a scan instruction screen stored in said external server,
in response to acceptance of a scan instruction input by a user on the basis of said scan instruction screen being displayed, controlling said scanner and storing the scanned image data output from said scanner in said memory,
receiving an external screen from said external server and storing the external screen in said memory, the external screen including an area for accepting a designation from a user, and an external control command assigned to said area for accepting the user designation and for causing said external server to perform a first predetermined image processing to the scanned image data that is a processing not provided by the internal server, processed image data processed by the first predetermined image processing being returned from said external server to said image processing apparatus,
generating an internal screen, the internal screen including an area for accepting a designation from a user, an internal control command assigned to said area for accepting the user designation and for causing said internal server to perform a second predetermined image processing that is a processing not provided by the external server, and an area for displaying said stored scanned image data,
generating an integrated screen by combining said internal screen and said stored external screen, and outputting said generated integrated screen to said internal server, and
obtaining a network address of said integrated screen from said internal server and transmitting the obtained network address to said external server; and
said external server being operable, in response to reception of a transmission request requesting transmission of a next screen from said browser after said scan instruction screen was transmitted to said browser, to return redirect information including said network address of the integrated screen to said browser.

2. The application cooperation system according to claim 1, wherein
said first processor configured to transmit a network address indicating the location of said stored scanned image data to said external server, and
said external server includes:
a second processor configured to:
in response to reception of said external control command from said browser, obtain said image data specified by said network address of the image data received, perform image processing specified by said received external control command on said image data, and update said image data with said processed image data, and
output an update request to said browser after said stored scanned image data has been updated by said second processor.

3. The application cooperation system according to claim 1, wherein
said first processor operable, in response to input of said internal control command from said browser to said internal server, to perform image processing specified by said received internal control command on said image data specified by said internal screen, and update said image data with said processed image data, and
said internal server outputs said integrated screen to said browser after said stored scanned image data has been updated.

4. The application cooperation system according to claim 1, wherein said first processor is configured to generate a preview image by reducing said image data in size, and update said stored scanned image data with said generated preview image.

5. The application cooperation system according to claim 1, wherein said first processor receives screen information from said external server and generates said internal screen in accordance with said received screen information.

6. The application cooperation system according to claim 1, wherein the application cooperation system comprises an image forming apparatus and the external server, and wherein the image forming apparatus includes at least said scanner and said browser.

7. An application cooperation system comprising:
a scanner configured to read a document to output scanned image data;
a memory configured to store a page described in a markup language;
a browser configured to receive a request for a page described in the markup language and display the page received in response to said request;
a first processor configured to:
  function as an internal server output the page stored in said memory in response to a request from said browser; and
  cause said browser, said internal server, and an external server to cooperate with each other by:
    starting said browser and causing said browser to display a page including a scan instruction screen stored in said external server,
    in response to acceptance of a scan instruction input by a user on the basis of said scan instruction screen being displayed, controlling said scanner and storing the scanned image data output from said scanner in said memory,
    receiving an external screen from said external server and storing the external screen in said memory, the external screen including an area for accepting a designation from a user, and an external control command assigned to said area for accepting the user designation and for causing said external server to perform a first predetermined image processing to the scanned image data that is a processing not provided by the internal server, processed image data processed by the first predetermined image processing being returned from said external server to said image processing apparatus,
    generating an internal screen and outputting said generated internal screen to said internal server, the internal screen including an area for accepting a designation from a user, an internal control command assigned to said area for accepting the user designation and for causing said internal server to perform a second predetermined image processing that is a processing not provided by the external server, and an area for displaying said stored scanned image data, and
    obtaining a network address of said internal screen from said internal server and transmitting the obtained network address of said internal screen to said external server;
said external server including a second processor configured to generate an integrated screen in response to reception of said network address of the internal screen, the integrated screen including said area for accepting said designation from said user, said external control command assigned to said area for accepting the user designation and for causing said external server to perform said first predetermined image processing that is a processing not provided by the internal server, and a partial display area for displaying said internal screen specified by said received network address, the integrated screen having described therein a command to transmit a transmission request including said received network address so as to display said internal screen in said partial display area,
said external server being configured to return said integrated screen in response to reception of a transmission request requesting transmission of a next screen from said browser after said scan instruction screen was transmitted to said browser.

8. The application cooperation system according to claim 7, wherein
said first processor configured to transmit a network address indicating the location of said stored scanned image data to said external server, and
said external server:
  operable, in response to reception of said external control command from said browser, to obtain said image data specified by said network address of the image data received, perform image processing specified by said received external control command on said image data, and update said image data with said processed image data, and
  configured to output an update request to said browser after said stored scanned image data has been updated.

9. The application cooperation system according to claim 7, wherein
said first processor operable, in response to input of said internal control command from said browser to said internal server, to perform image processing specified by said received internal control command on said image data specified by said internal screen, and update said image data with said processed image data, and
said internal server outputs said internal screen to said browser after said stored scanned image data has been updated.

10. The application cooperation system according to claim 7, wherein said first processor is configured to generate a preview image by reducing said image data in size, and update said stored scanned image data with said generated preview image.

11. The application cooperation system according to claim 7, wherein said first processor receives screen information from said external server and generates said internal screen in accordance with said received screen information.

12. The application cooperation system according to claim 7, wherein the application cooperation system comprises an image forming apparatus and the external server, and wherein the image forming apparatus includes at least said scanner and said browser.

13. An application cooperation method performed by an application cooperation system including an image processing apparatus and an external server, said image processing apparatus including
  a scanner configured to read a document to output scanned image data,
  a memory configured to store a page described in a markup language,
  a browser configured to request a page described in the markup language and display the page received in response to said request, and
  a processor configured to function as an internal server to output the page stored in said memory in response to a request from said browser,
the application cooperation method causing said image processing apparatus to perform steps of:
  starting said browser to cause said browser to display a page including a scan instruction screen stored in said external server;
  controlling said scanner in response to acceptance of a scan instruction input by a user on the basis of said scan instruction screen being displayed, and storing the scanned image data output from said scanner in said memory;

receiving an external screen from said external server and storing the external screen in said memory, the external screen including an area for accepting a designation from a user, and an external control command assigned to said area for accepting the user designation and for causing said external server to perform a first predetermined image processing to the scanned image data that is a processing not provided by the internal server, processed image data processed by the first predetermined image processing being returned from said external server to said image processing apparatus;

generating an internal screen, the internal screen including an area for accepting a designation from a user, an internal control command assigned to said area for accepting the user designation and for causing said internal server to perform a second predetermined image processing that is a processing not provided by the external server, and an area for displaying said stored scanned image data;

generating an integrated screen by combining said internal screen and said stored external screen, and outputting said generated integrated screen to said internal server; and obtaining a network address of said integrated screen from said internal server and transmitting the obtained network address to said external server;

the application cooperation method causing said external server to perform a step of, in response to reception of a transmission request requesting transmission of a next screen from said browser after said scan instruction screen was transmitted to said browser, returning redirect information including said network address of the integrated screen to said browser.

14. The application cooperation method according to claim 13,
causing said image processing apparatus to further perform a step of transmitting a network address indicating the location of said stored scanned image data to said external server, and
causing said external server to further perform:
an external updating step of, in response to reception of said external control command from said browser, obtaining said image data specified by said network address of the image data received from said image processing apparatus, performing image processing specified by said received external control command on said image data, and updating said image data with said processed image data; and
an update request outputting step of outputting an update request to said browser after said stored scanned image data has been updated in said external updating step.

15. The application cooperation method according to claim 13,
causing said image processing apparatus to further perform an internal updating step of, in response to input of said internal control command from said browser to said internal server, performing image processing specified by said received internal control command on said image data specified by said internal screen, and updating said image data with said processed image data, and
causing said internal server to perform a step of outputting said integrated screen to said browser after said stored scanned image data has been updated in said internal updating step.

16. The application cooperation method according to claim 13, causing said image processing apparatus to further perform a preview image generating step of generating a preview image by reducing said image data in size, and updating said stored scanned image data with said generated preview image.

17. The application cooperation method according to claim 13, wherein said internal screen generating step includes steps of
receiving screen information from said external server, and
generating said internal screen in accordance with said received screen information.

18. The application cooperation method according to claim 13, wherein the application cooperation system comprises an image forming apparatus and the external server, and wherein the image forming apparatus includes at least said scanner and said browser.

19. An application cooperation method performed by an application cooperation system including an image processing apparatus and an external server, said image processing apparatus including
a scanner configured to read a document to output scanned image data,
a memory configured to store a page described in a markup language,
a browser configured to request a page described in the markup language and display the page received in response to said request, and
a processor configured to function as an internal server to output the page stored in said memory in response to a request from said browser,
the application cooperation method causing said image processing apparatus to perform steps of:
starting said browser to cause said browser to display a page including a scan instruction screen stored in said external server;
controlling said scanner in response to acceptance of a scan instruction input by a user on the basis of said scan instruction screen being displayed, and storing the scanned image data output from said scanner in said memory;
receiving an external screen from said external server and storing the external screen in said memory, the external screen including an area for accepting a designation from a user, and an external control command assigned to said area for accepting the user designation and for causing said external server to perform a first predetermined image processing to the scanned image data that is a processing not provided by the internal server, processed image data processed by the first predetermined image processing being returned from said external server to said image processing apparatus;
generating an internal screen, the internal screen including an area for accepting a designation from a user, an internal control command assigned to said area for accepting the user designation and for causing said internal server to perform a second predetermined image processing that is a processing not provided by the external server, and an area for displaying said stored scanned image data;
outputting said generated internal screen to said internal server; and obtaining a network address of said internal screen from said internal server and transmitting the obtained network address of said internal screen to said external server;

the application cooperation method causing said external server to perform steps of:

generating an integrated screen in response to reception of said network address of the internal screen, the integrated screen including said area for accepting said designation from said user, said external control command assigned to said area for accepting the user designation and for causing said external server to perform said first predetermined image processing that is a processing not provided by the internal server, and a partial display area for displaying said internal screen specified by said received network address, the integrated screen having described therein a command to transmit a transmission request including said received network address so as to display said internal screen in said partial display area; and returning said integrated screen in response to reception of a transmission request requesting transmission of a next screen from said browser after said scan instruction screen was transmitted to said browser.

20. The application cooperation method according to claim 19, causing said image processing apparatus to further perform a step of transmitting a network address indicating the location of said stored scanned image data to said external server, and causing said external server to further perform:

an external updating step of, in response to reception of said external control command from said browser, obtaining said image data specified by said network address of the image data received from said image processing apparatus, performing image processing specified by said received external control command on said image data, and updating said image data with said processed image data; and an update request outputting step of outputting an update request to said browser after said stored scanned image data has been updated in said external updating step.

21. The application cooperation method according to claim 19, causing said image processing apparatus to further perform an internal updating step of, in response to input of said internal control command from said browser to said internal server, performing image processing specified by said received internal control command on said image data specified by said internal screen, and updating said image data with said processed image data, and causing said internal server to perform a step of outputting said internal screen to said browser after said stored scanned image data has been updated in said internal updating step.

22. The application cooperation method according to claim 19, causing said image processing apparatus to further perform a preview image generating step of generating a preview image by reducing said image data in size, and updating said stored scanned image data with said generated preview image.

23. The application cooperation method according to claim 19, wherein said internal screen generating step includes steps of receiving screen information from said external server, and generating said internal screen in accordance with said received screen information.

24. The application cooperation method according to claim 19, wherein the application cooperation system comprises an image forming apparatus and the external server, and wherein the image forming apparatus includes at least said scanner and said browser.

25. An application cooperation program for causing a computer to execute the application cooperation method according to claim 13.

26. An application cooperation program for causing a computer to execute the application cooperation method according to claim 19.

* * * * *